US012616975B2

(12) United States Patent
Kirsch-Rösner et al.

(10) Patent No.: US 12,616,975 B2
(45) Date of Patent: May 5, 2026

(54) THERMOBLOCK FOR RECEIVING AND REGULATING THE TEMPERATURE OF AT LEAST ONE LABORATORY SPECIMEN VESSEL, METHOD OF PRODUCTION AND SIMULATION METHOD

(71) Applicant: Eppendorf SE, Hamburg (DE)

(72) Inventors: Malte Kirsch-Rösner, Hamburg (DE); Florian Dürr, Hamburg (DE); Henner Tasch, Hamburg (DE); Thore Höper, Hamburg (DE); Manuel Petzold, Norderstedt (DE)

(73) Assignee: Eppendorf SE (DE)

( * ) Notice: Subject to any disclaimer, the term of this patent is extended or adjusted under 35 U.S.C. 154(b) by 695 days.

(21) Appl. No.: 17/756,712

(22) PCT Filed: Dec. 2, 2020

(86) PCT No.: PCT/EP2020/084235
§ 371 (c)(1),
(2) Date: May 31, 2022

(87) PCT Pub. No.: WO2021/110728
PCT Pub. Date: Jun. 10, 2021

(65) Prior Publication Data
US 2024/0042450 A1      Feb. 8, 2024

(30) Foreign Application Priority Data
Dec. 3, 2019    (EP) ..................................... 19213186

(51) Int. Cl.
*B01L 7/00*      (2006.01)
*B01L 9/00*      (2006.01)
*B33Y 80/00*     (2015.01)

(52) U.S. Cl.
CPC ................. *B01L 7/52* (2013.01); *B01L 9/523* (2013.01); *B33Y 80/00* (2014.12); *B01L 2300/0829* (2013.01)

(58) Field of Classification Search
CPC ........ B01L 7/52; B01L 9/523; B01L 2200/12; B33Y 80/00; B33Y 10/00; B22F 10/00
See application file for complete search history.

(56) References Cited

U.S. PATENT DOCUMENTS 6,657,169 B2 * 12/2003 Brown ...................... B01L 7/52
219/385
2016/0339437 A1    11/2016 Evans et al.
(Continued)

FOREIGN PATENT DOCUMENTS

DE        102010004035 A1     7/2011
GB            2521913 A  *   7/2015   ............. B33Y 80/00

OTHER PUBLICATIONS

International Search Report and Written Opinion dated Feb. 4, 2021 for PCT/EP2020/084235.
(Continued)

*Primary Examiner* — Lessanework Seifu
(74) *Attorney, Agent, or Firm* — Dorsey & Whitney LLP

(57) ABSTRACT

The invention relates to a thermoblock for receiving and regulating the temperature of at least one laboratory specimen vessel in a laboratory temperature regulation device, more particularly in a PCR thermocycler, wherein the thermoblock has been produced by means of an additive manufacturing method using a material containing metal. The invention further relates to a method for producing the thermoblock and a computer-implemented method for the simulation of physical characteristics of the thermoblock to be produced in accordance with the invention.

11 Claims, 10 Drawing Sheets

(56)              References Cited

U.S. PATENT DOCUMENTS

2018/0073054 A1      3/2018  Ma et al.
2020/0182555 A1*   6/2020  Zeller  ................ F28D 15/0233

OTHER PUBLICATIONS

International Preliminary Report on Patentability dated Jun. 16, 2022 issued in PCT international patent application No. PCT/EP2020/084235 (8 pages).

* cited by examiner

109

101

Boundary Box
(air)

Well segment (solid)

106

Air (liquid)

103

Water (fluid)

Block segment (solid)

z
x
y

Heat flow: 5.208W  102

109

106

101

103

117.18
110.27
103.37
96.47
89.57
82.66
75.76
68.86
61.95
55.05
48.15
41.24
34.34
27.44
20.53

Temperature [°C]

THERMOBLOCK FOR RECEIVING AND REGULATING THE TEMPERATURE OF AT LEAST ONE LABORATORY SPECIMEN VESSEL, METHOD OF PRODUCTION AND SIMULATION METHOD

This application is a Section 371 national phase filing of PCT Application No. PCT/EP2020/084235, filed on Dec. 2, 2020, and titled THERMOBLOCK FOR RECEIVING AND REGULATING THE TEMPERATURE OF AT LEAST ONE LABORATORY SPECIMEN VESSEL, METHOD OF PRODUCTION AND SIMULATION METHOD, which claims priority to European Patent Application No. 19213186.0, filed on Dec. 3, 2019, each of which is incorporated herein by reference in its entirety.

The present invention relates to a thermoblock for receiving and controlling the temperature of at least one laboratory sample container, particularly a multiplicity of laboratory sample containers, in a laboratory temperature control device, particularly in a PCR thermocycler. The invention also relates to a method for manufacturing a thermoblock and to a computer-implemented method for simulating physical properties of the thermoblock to be manufactured according to the invention.

Such thermoblocks are used particularly in thermocyclers that are intended for PCR (polymerase chain reaction). Thermocyclers are laboratory temperature control devices in which liquid samples are heated or cooled to specific temperature levels in temperature cycles. Peltier elements that are thermally coupled to the underside of the block are generally used for temperature regulation (temperature control). A temperature cycle consists of at least two—in the case of PCR often two or three—temperature levels, which are set according to a predetermined protocol and maintained for the desired duration. The temperature cycles are repeated many times successively in order to obtain the desired result, particularly the amplification of a DNA or DNA sequence. In the case of PCR, typical temperature levels of a temperature cycle are 55° C., 70° C., and 95° C. The optimum temperature levels for a specific amplification reaction can deviate from the three temperature values mentioned. The optimal temperature levels can be determined by applying a temperature gradient in a thermoblock, so that a variation of temperature levels can be simultaneously generated in the thermoblock. In the case of a PCR, for example, the optimal temperature of a temperature level is that temperature which—in combination with the other optimal temperature levels that are required—leads to the maximum yield of the amplified product.

The efficiency of a thermocycler or a thermoblock is measured, among other things, by the precision with which the temperature level is maintained. If, for example, a multiplicity of identical samples are heated simultaneously in a laboratory sample container in a thermoblock, it is desirable in most cases that the same temperature be set precisely in each laboratory sample container, e.g., the corresponding sample well of a PCR plate, and particularly also for the same duration. Given this objective, it is necessary that, for a given heating or cooling capacity of the temperature control devices acting on the thermoblock, maximally homogeneous temperature distribution in the thermoblock be achieved at the same time. One well-known source of temperature inhomogeneity in the thermoblock is the lateral edge regions of the thermoblock, which are more exposed to the ambient temperature from the lateral direction than the center of the block. If a thermoblock is temperature-controlled from below by means of Peltier elements, the temperatures measured in the sample container receptacles in the edge region deviate from the temperatures measured in the sample container receptacles in the center of the block. Some thermocycler manufacturers therefore work with additional temperature control devices that are arranged in the edge region and are intended to compensate for the environmental effects. This results in corresponding additional effort and expense in the production and maintenance of corresponding thermocyclers.

What is more, good temperature homogeneity can be achieved if the necessary heat flows are enabled in all regions of the thermoblock and efficient temperature control is promoted particularly in the edge regions of the thermoblock. The influence of the ambient temperature can also be minimized if the thermoblock has the highest possible specific heat capacity. These requirements are satisfied by thermoblocks made of solid metal, typically aluminum, in which the sample container receptacles as well as the additional desired external shape are produced by chip-removing manufacturing processes. The solid construction of such blocks leads to a high specific heat capacity and homogeneity. On the other hand, the high specific heat capacity also leads to a slow change in the temperature level and thus to a long overall process time for cyclic temperature control programs carried out with the thermoblock, as well as to higher energy consumption. The chip-removing manufacturing process also limits the possibilities for optimizing the block structure.

An alternative method for manufacturing a silver block is to first produce the sample container receptacles through electroplating, which are then soldered to a silver base plate in a further step. The result is a functional, material-saving block structure. As the applicant of the present invention has determined in comparative studies, rapid temperature changes can be achieved with such a silver block. The large number of production steps is not least also a source of error, so that this type of manufacturing is relatively complex.

Another requirement for thermoblocks is sufficient mechanical strength. A thermocycler typically uses a pressure plate with which the sample containers are pressed from above into the sample container receptacles and against the thermoblock. This ensures that each sample container is in complete contact with the interior surface of the respective sample container receptacle, which is what enables the homogeneous temperature-controlling of all of the samples that are being held by the thermoblock in the first place.

The object underlying the present invention is to provide an efficient thermoblock with maximally homogeneous temperature distribution and methods for manufacturing and optimizing the same.

The invention achieves this object by means of a thermoblock according to the present disclosure, a method for manufacturing the same, and a method for calculating the suitable shape structure of the thermoblock.

As part of the development work on the present invention, it was surprisingly found that not only the requirements for the thermal properties of the thermoblock but also the required mechanical strength of a thermoblock can be achieved by means of an additive manufacturing process. Thermoblocks manufactured using the additive manufacturing process offer the advantage that an integral design can be combined with a material-saving design that also offers the required sufficient mechanical strength.

In the context of this invention, "connected in a single piece" or "integrally connected" means that the two portions of the thermoblock connected in a single piece/integrally to one another were produced by means of a single additive manufacturing process, particularly using the metal-containing material. In particular, in the case of such one-piece production, these portions are not produced separately as joining parts in order to then be connected by joining, particularly in a further process step. The one-piece production of components is also generally known as integral construction, while the production of a component by joining different joining partners is known as differential construction.

Additive manufacturing processes are often based on the layered processing of a granular material. Due to the resulting surface and volume structure, a thermoblock produced using an additive manufacturing process is always clearly distinguishable from a thermoblock that was produced using a non-additive process, e.g., by means of a chip-removing manufacturing process, an electroplating process, or a casting process.

Selective Laser Melting (SLM) is preferably used as an additive manufacturing process for manufacturing the thermoblock. Electron beam melting is also preferably used as an additive manufacturing process for manufacturing the thermoblock.

In selective laser melting (SLM), a laser is used to locally melt powdered material (metals, mixed materials). The computer-controlled laser is aimed at points on a powder-filled plane that are defined by a 3D model. The process begins by dividing 3D CAD file data into a layered model, with layers between 10 and 100 microns thick, for example, creating a 2D image of each layer. This file format is the industry standard STL file used for most layer-based 3D printing or stereolithography technologies. This file is then loaded by a file preparation software package that assigns parameters, values, and support structures, if any, as machine data. This machine data is interpreted by an SLM machine to create the product, the thermoblock. In selective laser melting, thin layers of atomized fine metal powder are evenly distributed using a coating mechanism onto a substrate plate, usually metal, that moves on the vertical (Z) axis. This is done in a chamber containing a tightly controlled inert gas atmosphere. The model is created layer by layer. Each 2D slice of the part geometry is fused by selectively melting the powder within each layer and to the layer below using a high power continuous or pulsed laser beam. The laser energy is intense enough to allow complete melting (welding) of the particles to form solid metal. The process is repeated layer by layer until the part is complete. The chamber region includes a material dispensing platform, a build platform, and a sweeping blade that is used to move new powder across the build platform. One commercial SLM machine that is suitable for manufacturing the thermoblock according to the invention or for carrying out the manufacturing method according to the invention is the EOS M 290, available from EOS GmbH, Electro Optical Systems, 82152 Krailling, Germany. The company refers to the SLM used as DMLS (Direct Metal Laser Sintering).

In the current literature, the term "selective laser sintering (SLS)" is sometimes used synonymously instead of the term "selective laser melting." Sintering is the process of compacting and shaping a solid mass of material through heat and/or pressure without melting it to the point of complete liquefaction. In selective laser melting, it is generally assumed that the granular material is completely melted. In the context of the description of the present invention, both terms synonymously denote the same method insofar as differences are not expressly emphasized; it is assumed here that the terms SLM or SLS refer to processes in which the granular material is either partially or completely melted in order to ensure the unity, i.e., the integral construction, of the thermoblock to be manufactured. However, it is also possible and preferred that the method for manufacturing the thermoblock according to the invention provide one or more steps during which the not yet fully finished or not yet fully modeled thermoblock is treated at a high temperature in the respective manufacturing stage in order to achieve a partial or almost complete melting of the thermoblock or at least of portions thereof. In particular, the porosity of the material of the finished thermoblock can be influenced or controlled by the degree of heating.

The thermoblock preferably has one, a plurality, or a multiplicity of sample container receptacles that are connected to one another and/or integrally connected to a base portion or to a base plate by means of the additive manufacturing process using a metal-containing material. The method for manufacturing the thermoblock preferably comprises the step of manufacturing one, a plurality, or a multiplicity of sample container receptacles that are integrally connected to one another and/or integrally connected to a base portion or to a base plate by means of the additive manufacturing process. In the case of sample container receptacles that stand freely on a base portion or on a base plate, i.e. that are not supported on one another, integral manufacturing using an additive process is particularly advantageous, since integral manufacturing means that no individual material inhomogeneities occur in the transition region between the base portion and sample container receptacle, as can be the case, for example, in a two-step process manufacturing method in which the components base portion and sample container receptacles are first manufactured separately and then joined. Due to the homogeneous material transition in the case of integral production, the heat transfer properties of the thermoblock correspond especially reliably to the model properties as determined previously, for example, using a simulation method.

A sample container receptacle serves to enable the heat exchange between a temperature control device and each sample which, in applications of the thermoblock, is contained in the usual manner in a sample container that is arranged in the sample container receptacle. For this purpose, each sample container receptacle has an interior surface having a contact portion by means of which contact is made with the sample container that is arranged in the sample container receptacle. For the fastest possible temperature control, i.e., controlled heating or cooling to a target temperature, a heat exchange surface that is as large as possible is desired, so the contact portion should be as large as possible. On the other hand, the research on which the present invention is based showed that heating the sample container proportionally increases the temperature control rate only if and insofar as the interior surface of the sample container opposite the contact portion is also contacted by the liquid sample, with "opposite" or "opposing" meaning particularly situated across from and perpendicularly to the surface of the contact portion. The heat flow is most efficient perpendicular to the container wall, which is why they are usually made as thin as possible. The research also took into account that users of a thermoblock usually use typical fill levels in the sample containers that are usually substantially lower than the maximum filling capacity of the sample containers. Samples with a volume of 25 µl, 70 µl, 100 µl, 150 µl are often used in PCR. This lower part of a contact portion whose opposing interior surface of the sample container is contacted by the liquid sample when in the receiving position is also referred to as the fill level portion, while the upper part of the contact portion whose opposing interior surface of the sample container is not contacted by the liquid sample when in the receiving position is referred to as the empty portion.

It turns out that, for the purpose of rapid heat transfer, it is not necessary to dimension the height of the contact portions greater than corresponds to the typical fill level of the sample containers when they are arranged as intended in the sample container receptacles of the thermoblock. It has also proven to be advantageous to thermally couple the fill level portion to the underside (first side) of the base portion or the base plate of the thermoblock for the purpose of efficient heat transfer by means of sufficiently large heat transfer cross sections, which is particularly possible due to a sufficiently large wall thickness of the fill level portion, and particularly also of the lower end portion, of the sample container receptacle. Since the empty portion does not contribute efficiently to the temperature control of the sample that is arranged in the sample container, it is possible in principle to dispense with the temperature-controlling of this empty portion. At the same time, it is advantageous to keep the mass of the sample container receptacle low in the empty portion in order to avoid unnecessary temperature control of this mass region—and hence unnecessary energy consumption and an extension of the temperature control duration—or, in other words, to eliminate a parasitic heat capacity of the sample container receptacle.

The thermoblock preferably has a base portion on which one or more or a multiplicity of sample container receptacles are arranged, particularly integrally connected. The base portion is preferably a plate portion of the thermoblock; more particularly, it is a plate that is particularly substantially cuboid and particularly flat. The height of the plate is preferably less than the height of the sample container receptacles. The plate portion has an upper side and a lower side. The plate is also referred to as the base plate.

The sample container receptacles are preferably arranged in rows and columns, particularly in a rectangular grid arrangement, with the centers of the sample container receptacles, which are preferably rotationally symmetrical about a vertical longitudinal axis, lying at the crossing points of the grid. A rectangular grid arrangement refers here particularly to a lattice that is regularly constructed from grid cells with the same rectangular, particularly square, basic shape. The grid arrangement preferably conforms to the SBS standard, as described below. The number of sample container receptacles (and/or the preferred grid arrangement) can also be 8 (2×4), 16 (2×8 or 4×4), 32 (4×8), or 64 (8×8 or 4×16). The lattice arrangement can also correspond to a subregion of an SBS-compliant lattice arrangement, for example half of an SBS lattice arrangement with 8×12 lattice points, i.e., having 48 lattice points. The grid arrangement and the sample container receptacles are preferably set up and particularly shaped in such a way that standard sample containers can be arranged in the sample container receptacles, for example as described below. The grid arrangement does not have to be rectangular; in particular, the geometry of the individual grid cells does not have to be rectangular. In principle, it can correspond to a structured or an unstructured grid.

Typical sample containers are particularly those which are suitable for PCR. They are usually disposable plastic containers. They can be individual containers with or without a lid, or multiple containers, particularly microtiter plates. The latter are preferably suitable for PCR and are referred to in this case as PCR plates.

Individual containers typically have maximum filling volumes of 0.1 ml, 0.2 ml, or 0.5 ml; filling volumes between 10 µl and 2 ml are generally possible. The filling volumes are preferably between 10 µl and 200 µl. Individual containers that are to be received in the thermoblock preferably have lateral outer walls (and also inner walls) which are conical, so that insertion into the thermoblock and removal are possible without any problems, and so that efficient heat transfer can take place in this region. In particular, this region has the contact portions for heat transfer. The bottoms of the individual containers can optionally have the following shapes in particular: F-bottom (flat bottom), C-bottom (flat bottom with minimal rounded corners), V-bottom (tapered bottom), and U-bottom (U-shaped indentation).

Multiple containers, particularly microtiter plates or PCR plates, are preferably standard sample containers. Such microtiter plates or PCR plates contain many wells that are isolated from one another in rows and columns, resulting in a rectangular grid arrangement. The exact dimensions (length×width×height) are 127.76 mm×85.48 mm×14.35 mm according to the ANSI standard recommended by the Society for Biomolecular Screening (SBS) (SBS standard "ANSI/SBS 4-2004"). According to the standard, the microtiter plates or PCR plates can have different formats, all with the same base region and some with variable heights (number of wells, grid arrangement, typical filling volume in ml): 6, 2×3, 2-5; 12, 3×4, 2-4; 24, 4×6, 0.5-3; 48, 6×8, 0.5-1.5; 96, 8×12, 0.1-0.3; 384, 16×24, 0.03-0.1; 1536, 32×48 0,005-0,015; 3456, 48×72, 0.001-0,005. Other, nonstandard formats can also be used. The cups for receiving in the thermoblock preferably have lateral outer walls (and also inner walls) that extend conically, so that insertion into the thermoblock and removal are possible without any problems, and so that efficient heat transfer can take place in this area. In particular, this region has the contact portions for heat transfer. The bottoms of the cups can optionally have the following shapes in particular: F-bottom (flat bottom), C-bottom (flat bottom with minimal rounded corners), V-bottom (tapered bottom), and U-bottom (U-shaped indentation).

In the context of the description of the invention, the terms "top" and "bottom" usually refer to the direction of gravity, since the sample containers are intended to be filled with liquid sample, which requires the base portion to be positioned horizontally so that the central longitudinal axis of each sample container receptacle is arranged vertically. The front side of the thermoblock is the side that faces toward the front of the laboratory device—particularly forward toward the user when he or she is working in front of the laboratory device—when the thermoblock is installed as intended in a laboratory device, particularly a PCR thermocycler, and the back or rear side of the thermoblock is the side facing toward the rear of the laboratory device—particularly facing backward away from the user when he or she is working in front of the laboratory device—when the thermoblock is installed as intended in a laboratory device, particularly a PCR thermocycler. Analogously, the "left" and "right" side of a thermoblock can be defined from the perspective of a user who is positioned frontally in front of the laboratory device with the thermoblock installed as intended and looks at it "from left to right." The lower side of a thermoblock or one of its components is also referred to as its first side; the oppositely situated upper side of a thermoblock or of one of its components is also referred to as its second side.

A base portion or a base plate is preferably manufactured with at least one of the design features mentioned below, particularly additively. It is preferred that the at least one sample container receptacle was manufactured using an additive manufacturing process, particularly without interruption of this manufacturing process. However, it is also possible and preferred for the base portion or the base plate to be manufactured separately using an additive manufacturing process or another manufacturing process, for example using a casting process, a chip-removing process, or an electroplating process.

The base plate has a first plate side, which is set up for thermal coupling to one or more temperature control devices, and a second plate side, situated opposite the first plate side, which is preferably connected in a single piece to a multiplicity of sample container receptacles for receiving and controlling the temperature of a multiplicity of laboratory sample containers. The first plate side is preferably planar. The second plate side is preferably planar and has at least one transition cross-sectional area that represents the transition of the base plate with the at least one sample container receptacle. A base plate can have at least one opening and/or at least one recess and/or at least one projection portion, the latter of which may protrude from a planar first or second side. Such deviations from purely planar sides of the plate can be provided if this is conducive to the desired heat distribution, particularly if this is conducive to the homogeneous temperature distribution of the sample container receptacles, particularly to the equal temperature-controlling of the contact portions of the sample container receptacles.

The base plate preferably has a length l, a width b, and a height h, each perpendicular to the others, which, for further explanation, can be aligned along the axes x, y, z of a Cartesian coordinate system corresponding to x/l, y/b, z/h. The length and width of the base plate are preferably dimensioned in such a way that standard sample containers can be arranged in corresponding sample container receptacles above the base plate. Preferred length dimensions are between 50 mm and 260 mm or between 60 mm and 160 mm; preferred width dimensions are between 40 mm and 180 mm or between 60 mm and 120 mm. Preferred height dimensions are between 1.0 mm to 15.0 mm or between 0.3 mm to 0.8 mm. The length, width, and/or height is either measured in such a way that any lateral projections of the substantially cuboid base plate are not taken into account, or that the dimensions are taken as the maximum extension of the base plate along the x-axis (when measuring l), as the maximum extension of the ground plane along the y-axis (when measuring b), or as the maximum extension of the ground plane along the z-axis (when measuring h).

The thermoblock preferably has one, a plurality, or a multiplicity of sample container receptacles that are connected to one another and/or integrally connected to a base portion or to a base plate by means of the additive manufacturing process using a metal-containing material. The method for manufacturing the thermoblock preferably comprises the step of manufacturing one, a plurality, or a multiplicity of sample container receptacles that are integrally connected to one another and/or integrally connected to a base portion or to a base plate by means of the additive manufacturing process.

The thermoblock preferably has a plurality (greater than or equal to two) or a multiplicity (greater than or equal to six) of sample container receptacles that are particularly arranged next to one another along a plane that extends particularly parallel to a planar first side of the base plate of the thermoblock. The preferably circular openings of the sample container receptacles at the upper end of the sample container receptacles are preferably all parallel to the planar first side of the base plate of the thermoblock. The sample container receptacles are preferably arranged in a rectangular grid having rows and columns.

A sample container receptacle is preferably manufactured with at least one of the design features mentioned below, particularly additively. It is preferred that the at least one sample container receptacle was manufactured using an additive manufacturing process, particularly integrally and/or particularly without interruption of this manufacturing process. Preferably, at least two sample container receptacles were manufactured using an additive manufacturing process, particularly integrally and/or without interruption of this manufacturing process. The base portion, particularly the base plate, and the at least one sample container receptacle were preferably manufactured integrally and/or particularly without interruption of this manufacturing process using an additive manufacturing process.

However, it is also possible and preferred for the at least one sample container receptacle to be manufactured separately using an additive manufacturing process or another manufacturing process, e.g., using a casting process, a chip-removing process, or an electroplating process. Sample container receptacles can be manufactured individually, or a plurality of sample container receptacles can be manufactured integrally in groups, or all of the sample container receptacles can be manufactured together as integral components. It is then preferred that the at least one sample container receptacle be connected to the base portion individually, in groups, or as an overall component after the manufacture thereof. It is possible and preferred for the base portion to be added to the at least one separately manufactured sample container receptacle by additive manufacturing. It is possible for the material of the at least one sample container receptacle to be melted in order to subsequently add the first material layer of the base portion, which is then gradually built up. It is also possible and preferred that the at least one sample container receptacle be added to the separately manufactured base portion by additive manufacturing.

A sample container receptacle preferably has an internal volume that is serves to hold a sample container portion. As a result of the receiving of the sample container portion of a sample container in a receiving position, contact is established between the sample container and the sample container receptacle. This contact takes place via a contact surface of the contact portion of the sample container receptacle. The interior volume is preferably surrounded by at least one receiving wall and is particularly delimited by an interior surface of the at least one receiving wall or of the sample container receptacle. The receiving wall can be functionally divided into two or more wall portions.

A sample container receptacle preferably has a central longitudinal axis A along which the sample container receptacle extends. The longitudinal axis A preferably extends perpendicular to a preferably planar second side or to a planar portion of the second side of a base portion or of a base plate. The sample container receptacle is preferably designed to be rotationally symmetrical with respect to this longitudinal axis A, which is common in the prior art. However, it is also possible and preferred that the sample container receptacle be preferably not designed to be rotationally symmetrical with respect to this longitudinal axis A.

The sample container receptacle preferably has a lower end portion via which the sample container receptacle is connected, particularly integrally, to the base portion or to a base plate. The lower end portion can be a volume area of the sample container receptacle that is arranged below a wall portion, particularly a foot portion of the sample container receptacle, or it can be a surface. This surface, which is part of the lower end portion and also forms the transition cross-sectional area or the connection between the sample container receptacle and the base portion or base plate, is preferably circular, but it can also have a different shape. The lower end portion can be defined by virtue of the fact that it does not contain the contact portion, particularly neither completely nor proportionally.

The sample container receptacle preferably has a wall portion that is arranged particularly substantially or predominantly above the lower end portion. The sample container receptacle preferably has an upper end portion that is the opening portion and is arranged particularly above the wall portion. The wall portion is preferably conical in shape, with the cone tapering from top to bottom. The wall portion can be defined particularly as that portion of the sample container receptacle which delimits the internal volume of the sample container receptacle along the longitudinal axis A and whose interior surface is conical. In particular, the lower end portion can contain a portion of the sample container receptacle, particularly also including that portion which delimits the internal volume of the sample container receptacle and whose interior surface is not conical. The wall portion is preferably formed as a portion of a hollow cone that extends rotationally symmetrically about the axis of rotation A (longitudinal axis A). As a result, the complementary cone-shaped sample containers can be easily inserted and removed.

The wall portion preferably has a first, lower wall portion which forms part of the contact portion, particularly the lower portion of the contact portion, and which, when viewed particularly along the longitudinal axis A, lies above the lower end portion and, in particular, lies below a second, upperwall portion. The lowerwall subportion is preferably the fill level portion. The wall portion preferably has at least one second, upper wall portion that does not contain any part of the contact portion. The top wall portion is preferably the empty portion. The lower wall portion can be defined as having a greater thickness than the upper wall portion. The thicknesses mentioned do not have to be constant along the wall portion. Preferably, the thickness of the lower wall portion increases with decreasing distance from the lower end portion as viewed along the longitudinal axis A. The lower wall portion can be a foot portion of the sample container receptacle that widens downward or widens toward the lower end portion or has an increasing cross section when viewed perpendicularly to the longitudinal axis A. This broadening particularly enables a greater flow of heat between the base portion and the sample container receptacle and also supports the arrangement of the sample container receptacle relative to the base portion. The lower wall portion can be part of a foot portion.

The sample container receptacle preferably has an upper end portion that is connected, particularly integrally connected, to the wall portion. The upper end portion is preferably the opening portion, which also has the upwardly directed, preferably circular opening through which a sample container is inserted into the sample container receptacle.

The height of the lower end portion can be between 0.0 and 5.0 mm, preferably between 0.0 and 3.0 mm, and preferably between 0.0 and 1.5 mm.

The height of the wall portion can be between 0.0 and 15.0 mm, preferably between 0.0 and 10.0 mm, and preferably between 0.0 and 8.0 mm.

The height of the first wall subportion of the wall portion can be between 0.0 and 15.0 mm, preferably between 0.0 and 10.0 mm, and preferably between 0.0 and 8.0 mm.

The height of the second wall subportion of the wall portion can be between 0.0 and 15.0 mm, preferably between 0.0 and 10.0 mm, and preferably between 0.0 and 8.0 mm. The height of the second portion can be greater than or less than or equal to the height of the first portion.

The height of the upper end portion can be between 0.0 and 5.0 mm, preferably between 0.0 and 3.0 mm, and preferably between 0.0 and 1.5 mm.

The amount can also be each of the above values, or it can be at least the smaller or the larger value, while the respective other value can be excluded, or all of the values mentioned can be excluded.

In conventional thermoblocks, all of the sample container receptacles, or—in the case of milled thermoblocks—all of the block portions that contain the sample container receptacles are of the same design, particularly having the same shape and being arranged in the same shape on a base portion. The additive manufacturing process makes it possible for each portion of the sample container receptacle to be individually designed, particularly shaped, depending on the requirement. The additive manufacturing process also makes it possible for each sample container receptacle to be designed individually as required, or for certain groups of sample container receptacles to be individually designed, particularly shaped, so that the sample container receptacles within the same group have the same shape and/or are arranged in the same shape on a base portion. "Individually designed" means that the sample container receptacle is shaped differently and/or is arranged at least with a differently shaped foot portion on a base portion than other sample container receptacles, or that the sample container receptacles of a group are shaped differently and/or are arranged at least with a differently shaped foot portion on a base portion than the sample container receptacles of another group.

Particularly when a plurality of sample container receptacles are arranged next to one another, particularly in a rectangular grid arrangement, the following preferred configurations exist:

The sample container receptacles at the edge are preferably shaped differently than the sample container receptacles that are not at the edge; in particular, they are shaped differently than the sample container receptacles in the central inner region of the sample container receptacle arrangement. The sample container receptacles that are positioned in the corners of the arrangement are preferably shaped differently than the sample container receptacles at the edge and/or the sample container receptacles that are not at the edge. Those sample container receptacles are considered to be arranged at the edge which are arranged on the periphery of a base portion, particularly of the rectangular base plate, and therefore have fewer adjacent sample container receptacles there than more centrally arranged sample container receptacles in the central inner region of the sample container receptacle arrangement that are not at the edge.

The lower end portions of the sample container receptacles at the edge are preferably shaped differently than the lower end portions of the sample container receptacles that are not at the edge; in particular, they are shaped differently than the lower end portions of the sample container receptacles in the inner region of the sample container receptacle arrangement. The lower end portions of the sample container receptacles that are positioned in the corners of the arrangement are preferably shaped differently than the lower end portions of the sample container receptacles at the edge and/or than the lower end portions of the sample container receptacles that are not at the edge.

The wall portions of the sample container receptacles at the edge are preferably shaped differently than the wall portions of the sample container receptacles that are not at the edge, being particularly shaped differently than the wall portions of the sample container receptacles in the inner region of the sample container receptacle arrangement. The wall portions of the sample container receptacles that are positioned in the corners of the arrangement are preferably shaped differently than the wall portions of the sample container receptacles at the edge and/or than the wall portions of the sample container receptacles that are not at the edge. By virtue of the different configuration, the heat flow or the heat capacity of the thermoblock can be influenced depending on the position in the thermoblock.

The lower end portions of the sample container receptacles at the edge preferably have a larger volume or a greater mass than the lower end portions of the sample container receptacles that are not at the edge, particularly a larger volume or a greater mass than the lower end portions of the sample container receptacles in the inner region of the sample container receptacle arrangement. The lower end portions of the sample container receptacles that are positioned in the corners of the arrangement preferably have a larger volume or mass than the lower end portions of the sample container receptacles at the edge and/or than the lower end portions of the sample container receptacles that are not at the edge. With these configurations, the heat flow and the heat capacity in the named sample container receptacles can be set up differently, particularly increased in the edge region of the thermoblock, since the edge regions are subject to the influence of the usually substantially lower ambient temperature.

A lower end portion of one, a plurality of, or all sample container receptacles is preferably shaped in such a way that it widens downward, at least in portions, starting from an upper portion of the sample container receptacle, particularly of the wall portion, to the base portion. The foot portion defined in this way enables a greater flow of heat between the sample container receptacle and the wall portion, whereby the sample container receptacle with a foot portion is heated more quickly than a sample container receptacle without a foot portion. In addition, the foot portion reinforces the position of the sample container receptacle on the base portion against mechanical effects.

The foot portion is preferably shaped like a cone, with a vertical cross section extending through the longitudinal axis A, it being particularly possible for any vertical cross section of the exterior surface of the foot portion extending through the longitudinal axis A to be shaped as a straight line, but it can also be shaped as a non-straight line, being particularly concave in shape.

A sample container receptacle is preferably cup-shaped, i.e., the sample container receptacle is then designed like a cup with the opening pointing upward.

A sample container receptacle, a plurality of sample container receptacles, or all sample container receptacles of the thermoblock can be connected to the base portion solely by means of their wall portion or lower end portion, particularly without horizontally extending connecting portions being provided above the base portion and particularly below the upper end portion which connect adjacent sample container receptacles. Such sample container receptacles are also referred to as freestanding.

In the upper end portion, a plurality of or all sample container receptacles can be connected by a perforated plate, in which case a sample container receptacle or the upper end portion thereof or the opening thereof can be arranged in a hole in the perforated plate. The sample container receptacles of such an arrangement are not referred to as freestanding, since they are supported on one another via connecting element(s), here the perforated plate.

The thermoblock preferably has a base portion and a sample container portion, with the at least one sample container receptacle being arranged in the latter. The base portion and/or the sample container portion are preferably substantially cuboid, in that the base portion in particular can have the shape of a cuboid plate and, in particular, the sample container receptacles of the sample container portion span a substantially cuboid region. The base portion and the sample container portion can be connected to one another substantially within a transition region, which can be embodied as a plane—referred to as a transition plane—or as a plate-shaped transition region, for example due different sample container receptacles beginning at different heights on the base portion. It is also possible for the thermoblock not to have a base portion but rather to be formed by the sample container portion whose sample container receptacles are connected by connecting portions, particularly by connecting portions that extend horizontally between adjacent sample container receptacles and connect the same, particularly by connecting portions that extend horizontally between the lower end portions and/or wall portions and/or upper end portions of adjacent sample container receptacles and connect the same. These connecting portions can, in particular, be components of a grid network that connects the sample container receptacles or of at least one perforated plate through whose holes the sample container receptacles extend and are connected thereto. However, the connecting portions mentioned can also be provided if the thermoblock contains a base portion.

The sample container portion has at least one or a plurality of connecting portions that connect adjacent sample container receptacles. These connecting portions are particularly connecting portions that extend horizontally between adjacent sample container receptacles and connect the same, particularly connecting portions that extend horizontally between the lower end portions and/or wall portions and/or upper end portions of adjacent sample container receptacles and connect the same. These connecting portions can, in particular, be components of a grid network that connects the sample container receptacles or of at least one perforated plate through whose holes the sample container receptacles extend and are connected thereto. However, the connecting portions mentioned can also be provided if the thermoblock contains a base portion.

Particularly when a plurality of sample container receptacles are arranged next to one another and form a sample container portion, particularly in a rectangular grid arrangement, the following preferred configurations exist:

At least one or exactly one connecting portion can be provided between directly adjacent sample container receptacles, particularly between a plurality of or all directly adjacent sample container receptacles. In a rectangular grid of sample container receptacles, two successive sample container receptacles in a row of the grid are considered to be directly adjacent, and two successive sample container receptacles in a column of the grid are considered to be directly adjacent. However, at least one or exactly one connecting portion can also be provided between diagonally adjacent sample container receptacles, particularly between a plurality of or all diagonally adjacent sample container receptacles. If there is another sample container receptacle between two sample container receptacles, the first two sample container receptacles are not considered to be adjacent.

A void can be provided between the connecting portion that connects adjacent sample container receptacles and the base portion, there particularly on the plane formed by the longitudinal axes of these sample container receptacles, i.e., particularly below the connecting portion. In particular, it may be that this connecting portion is not connected directly to the base portion, but that the connecting portion is connected indirectly to the base portion via the sample container receptacles. In this case, the connecting portion contributes to the cooling of the sample container receptacle through the convection of the ambient air that flows around the connecting portion. This connecting portion or this structure is therefore suitable for cooling hotter sample container receptacles and improving homogeneity in the thermoblock. Structural parameters that determine the optimal heat extraction are the thickness of the connecting portion or of the structure and the distance, particularly the shortest distance, between the connecting portion or structure and the base portion or base plate, the mass, and/or the surface area of the connecting portion. Another benefit of this connecting portion or of this structure between the sample container receptacles is that they can give the component the required stability and rigidity in individual cases. The connecting portions or the structures are then as far away as possible from the center of gravity of the component and can therefore be designed to be smaller and/or thinner. Another advantage is that the thermal influence of small structures is relatively small. The heat has to flow through the sample receptacle first and consequently heats up the structure last.

It is also possible and preferred for no void to be provided between the connecting portion connecting adjacent sample container receptacles and the base portion, there particularly on the plane formed by the longitudinal axes of the sample container receptacles, i.e., particularly below the connecting portion. The connecting portion can be connected directly to the base portion. In that case, the connecting portion also serves to heat or control the temperature of the sample container receptacle by means of the temperature control devices. This can apply to a plurality of or to many connecting portions or to all connecting portions of a sample container portion or thermoblock. This arrangement has the effect that the heat is conducted from the hotter spaces to the sample container receptacles, whereby the homogeneity can be increased. Structural parameters here are the thickness of the connecting portion, the mass and/or surface area thereof, and the general shape of the connection, e.g., rounded with variable diameters, triangular with variable angles.

The wall portions, particularly a lower wall subportion and/or an upper wall subportion of the sample container receptacles, can have different thicknesses. An individual thickening of the wall thicknesses of the sample container receptacles can be provided: If the correct choice is made, the individual variation in the wall thickness has a positive effect on the homogeneity and the speed of the thermoblock. The individual thicknesses of the wall portions, the mass, and/or the surface area of the sample container receptacles are structural parameters of the thermoblock that can be optimized.

A connecting portion that connects adjacent sample container receptacles can be bar-shaped, particularly plate-shaped. The plate is characterized by a thickness, an outer contour, and a main plane which can be horizontal, i.e., parallel to the xy plane, or which can be vertical to the xy plane and parallel to the z axis. Thickness and outer contour are structural parameters of the thermoblock that can be optimized.

The connecting portion can have one or more recesses and/or openings and/or projections, or it can be latticed and/or porous. In this way, the thermally conductive properties of the connecting portion can be influenced.

The use of one or more foot portions for sample container receptacles and/or the use of connecting portions between adjacent sample container receptacles and the variation of the structural parameters of the thermoblock that define the structure realize the following inventive idea: Using the additive manufacturing process, material is only built up where it has a positive influence on the heat conduction between the temperature control device and the sample. Additional structures for ensuring mechanical robustness and stability and structures that serve to provide a seal between the thermoblock, the temperature control device(s), and the environment can be exceptions here.

A sample container receptacle has an internal volume which extends particularly starting from an interior surface of the bottom wall of the sample container receptacle along the longitudinal axis A over a distance up to the opening thereof. This distance is referred to as the depth of the sample container receptacle. The openings of the sample container receptacles of a thermoblock are preferably on a common plane, and a plurality of or all sample container receptacles preferably have the same depths. However, it is also possible and preferred that the depth of one or more sample container receptacles, particularly of sample container receptacles located at the edge, be greater than that of the sample container receptacles that are not located at the edge. The internal volumes of the sample container receptacles with greater depth can particularly extend deeper and particularly even into the base portion. As a result, the heat transfer can be improved in the edge region, and homogeneity can be increased. The depths of sample container receptacles are structural parameters of the thermoblock that can be optimized.

It is possible and preferred that a base portion or a base plate have regions of different thickness. By placing additional material on the base plate in a targeted manner, local heat capacities can be adjusted in order to increase the homogeneity of the thermoblock. Analogously, the heat capacity can be further reduced by local hollows in the base portion or in the base plate. This can improve speed and homogeneity. Thickness and outer contour of the regions of different thickness are structural parameters of the thermoblock that can be optimized.

The thermoblock is preferably provided with a receiving frame and/or a sealing frame that extends around the thermoblock, particularly so as to be parallel to the base plate or to the xy plane. By virtue of the design freedom of the additive manufacturing process, the sealing frame/mounting frame can also be combined with the base plate, and the heat capacity can be further reduced.

The temperature control devices are preferably arranged between the thermoblock and a heat sink, and these components are pressed against one another by fastening means, particularly screws. The additive manufacturing process also makes it easy to integrate support structures, particularly grid structures, that are arranged above the base portion or the base plate and can extend particularly between the base portion and the plane of the openings of the sample container receptacles absorb the connective forces when said components are fastened.

Complex structures of the thermoblock can be realized with the additive manufacturing process. The thermoblock preferably has at least one or a plurality of base plates with a planar lower side, and at least one or a plurality of sample container portions. The sample container portion can have one or more recesses and/or openings and/or projections between the sample container receptacles, or it can be porous. One or more or each sample container receptacle can have one or more recesses and/or openings and/or projections, or they can be porous. In this way, the thermally conductive properties of the connecting portion can be influenced.

The thermoblock is preferably characterized in that it was manufactured by means of an additive manufacturing process, in that a base portion and at least one sample container receptacle were manufactured, preferably integrally, by means of an additive manufacturing process.

The additive manufacturing process makes it possible to manufacture the thermoblock—which usually exists virtually as a data model—from a desired direction without having to start the additive manufacturing from the lower end of the thermoblock. By rotating the virtual model and defining the horizontal manufacturing layers of an additive manufacturing process from the rotated position, it is possible in principle to manufacture the thermoblock not from its lower side toward its upper side, but from a different direction. For example, the thermoblock can be fabricated from the upper side toward the lower side, or from the left side toward the right side, or from the front side toward the rear side. The choice of the direction of fabrication will depend on the fact that the production can be carried out efficiently, possibly also as a function of the fact that the desired structures of the thermoblock can possibly only be produced from a defined direction.

Preferably, the thermoblock is characterized in that it was manufactured using an additive manufacturing process in that first a base portion of the thermoblock was manufactured using the additive manufacturing process, whereupon the at least one sample container receptacle was manufactured using the additive manufacturing process, particularly without interruption of the additive manufacturing process between the fabrication of the base portion and the fabrication—particularly of the first layer—of the at least one sample container receptacle.

However, it is also possible and preferred for the thermoblock to be manufactured using an additive manufacturing process, in that the at least one sample container receptacle was first manufactured using the additive manufacturing process, whereupon a base portion of the thermoblock was manufactured using the additive manufacturing process, particularly without interruption of the additive manufacturing process between the fabrication of the at least one sample container receptacle and the fabrication—particularly of the first layer—of the base portion.

It is preferred that the at least one sample container receptacle and/or the base portion was manufactured using an additive manufacturing process, particularly without interruption of this manufacturing process. However, it is also possible and preferred for the at least one sample container receptacle and/or the base portion to be manufactured separately using an additive manufacturing process or another manufacturing process, e.g., by means of a casting process, a chip-removing process, or an electroplating process.

Sample container receptacles can be manufactured individually, or a plurality of sample container receptacles can be manufactured in groups, or all of the sample container receptacles can be manufactured together as integral components. It is then preferred that the at least one sample container receptacle be connected to the base portion individually, in groups, or as an overall component after the manufacture thereof. The base portion is preferably added to the at least one sample container receptacle through additive manufacturing. It is possible for the material of the at least one sample container receptacle to be melted in order to subsequently add the first material layer of the base portion, which is then gradually built up.

The laboratory device containing the thermoblock is preferably a (PCR) thermocycler. However, it is also possible for the laboratory device containing the thermoblock to be a thermomixer. The thermoblock and/or the laboratory device containing the thermoblock can be part of a laboratory machine, particularly a laboratory pipetting machine for high-throughput processing of liquid samples (automatic liquid handling machine).

A thermocycler is a device that is able to set the temperature of at least one sample to a predetermined temperature one after the other and to keep it at this temperature level for a predetermined period of time. The process flow of this temperature control is cyclical. This means that a predetermined temperature cycle, i.e., a sequence of at least two temperature levels, is carried out repeatedly. This method is used particularly to carry out a polymerase chain reaction (PCR). In this context, a thermocycler is also sometimes referred to as a PCR block. A thermocycler, particularly the treatment device of the thermocycler, preferably has a thermoblock. A thermoblock is a sample receptacle made of a heat-conducting material, usually a metal-containing material or a metal, particularly aluminum or silver. The sample receptacle has a contact side that is contacted by at least one heating/cooling device of the thermocycler, particularly a Peltier element. The thermocycler, particularly the treatment device of the thermocycler, has a control device with at least one control circuit to which the at least one heating/cooling device is associated as an actuator and at least one temperature measurement device as a measuring element. The temperature of a temperature stage is regulated by means of the control device. A heat sink of the thermocycler, particularly the treatment device of the thermocycler, is used to cool portions of the thermocycler, particularly to cool the Peltier elements. The thermocycler, particularly the treatment device of the thermocycler, can have additional heating and/or cooling elements. The thermocycler, particularly the treatment device of the thermocycler, preferably has a timer device with which the time parameters for setting the temperature cycle can be controlled.

A thermal mixer, also referred to as a "thermal mixing device," is used to move a temperature-controlled laboratory sample, particularly to mix a laboratory sample containing a plurality of components. Thermomixers, particularly the treatment device thereof, can be set up particularly to carry out an oscillating movement. Thermomixers, particularly the treatment device thereof, have in particular a drive for driving the movement; they have in particular a timer device with which the time parameters of the setting of the mixing treatment can be controlled; and they have in particular at least one heating/cooling device and at least one control device with at least one control circuit to which at least one heating/cooling device is associated as an actuator and at least one temperature measuring device as a measuring element. In the case of a thermal mixer, the device-controlled treatment of the at least one laboratory sample corresponds to a mixing treatment to which the at least one sample is subjected.

The thermoblock preferably has mounts for temperature sensors. These are preferably arranged above the base plate of the thermoblock so that the temperature acting on the sensor corresponds more closely to the temperature within the sample when the thermoblock is in operation. In conventionally manufactured thermoblocks, the temperature sensors are usually arranged in direct thermal contact with the base plate or directly on the base plate; as a result, the target temperature at the sensor is usually reached much earlier than in the sample, so that the delay in cycling may have to be taken into account.

The homogeneity of a thermoblock can be tested in various ways. One possibility is to attach calibrated temperature sensors to differently positioned sample container receptacles on the thermoblock and to determine the homogeneity during operation of the thermoblock, for example as the standard deviation of the mean value of the temperature on the thermoblock. Another possibility is to allow the same PCR reaction to take place in differently positioned sample container receptacles of the thermoblock and to determine the yield of the amplified product in each sample container. Another possibility is to determine the homogeneity from a simulation process in which the temperature distribution of the thermoblock manufactured according to the invention is calculated using a data model of the thermoblock manufactured according to the invention. One suitable method for determining the homogeneity of the temperature distribution of a thermoblock is given in Eppendorf APPLICATION NOTE no. 244 from December 2011, available at www.eppendorf.de.

The rate at which a thermoblock is brought to temperature can be identified by determining how long a desired temperature rise in the thermoblock lasts under a known constant heating output or what the temperature difference is when a thermoblock is heated for a predetermined period under a known constant heating output. One suitable method for determining the rate at which a thermoblock is brought to temperature is described in Eppendorf APPLICATION NOTE No. 274, available at www.eppendorf.de.

Additive manufacturing of the thermoblock starts from a granular material that preferably contains metal, preferably aluminum, or silver or titanium. Ceramic materials are also plausible. Nonmetallic or other materials are possible, for example those containing or consisting of silicon carbide or carbon or graphite.

The invention also relates to the method for manufacturing a thermoblock that is used to hold and control the temperature of laboratory sample containers in a laboratory temperature control device, particularly in a PCR thermocycler, comprising the step: *manufacturing the thermoblock using an additive manufacturing process, preferably based on a metal-containing granulate.

The invention also relates to the method (hereinafter also referred to as the "simulation method") for calculating the form structure of a thermoblock which is used to receive and control the temperature of laboratory sample containers in a laboratory temperature control device, particularly in a PCR thermocycler, and which can be manufactured by means of an additive manufacturing process that is computer-controlled and dependent on at least one structural parameter, the form structure of the thermoblock being definable by the at least one structural parameter, comprising the step:

varying at least one structural parameter;

carrying out a simulation method for simulating the flow of heat through at least one portion of the thermoblock as a function of the at least one structural parameter;

selecting at least one structural parameter that defines the thermoblock to be manufactured as a function of the simulation method and, particularly, providing this at least one structural parameter for the subsequent additive manufacturing of the thermoblock that has been structurally determined in this way.

Suitable structural parameters for carrying out the simulation method are contained in the present description of the invention or can be derived directly from the description of preferred structural configurations of the thermoblock. The simulation method can be performed using commercially available software, such as finite element software. ANSYS from Ansys Inc., Pennsylvania, USA is particularly suitable.

In a preferred embodiment, the thermoblock is characterized in that it was manufactured according to the following manufacturing method; the same steps also characterize a preferred embodiment of the method according to the invention for the manufacture of the thermoblock:

fabricating a base portion or a base plate, preferably by means of the additive manufacturing process or another manufacturing process;

additive manufacturing of the at least one sample container receptacle above the base portion or the base plate, particularly with—particularly local—melting of the top layer of the base portion or the base plate in order to integrally connect the granular material to be processed additively with the base portion or the base plate, the uppermost layer of the base portion or the base plate preferably having or consisting of the same material.

Optional steps: *before the additive manufacturing step: forming a stacked assembly by connecting the temperature control devices, particularly Peltier elements, provided for use with the thermoblock to be manufactured to the base portion or the base plate and preferably also to a heat sink; *then: measuring the homogeneity of the temperature distribution on the base portion or the base plate, this homogeneity being a result of the individual design of the temperature control devices, particularly Peltier elements, particularly the homogeneity of the heat transport performance of the temperature control devices over the surface thereof, particularly a result of the individual design and/or connection of the heat sink to the temperature control device(s), particularly a result of the individual thermal coupling of the temperature control devices to the base portion or the base plate, particularly by means of a heat-conducting medium such as a thermally conductive pad, particularly one containing graphite, particularly a result of the electronic control and/or voltage supply of the temperature control devices by means of a control device, particularly a result of the spatial arrangement of the temperature control devices connected to the base portion or the base plate relative to the component(s) of a laboratory device, particularly a thermocycler, if the thermoblock (or base portion and temperature control devices) is arranged as intended in the laboratory device, it being possible in particular for these components to be a frame in which the base portion is enclosed.

It is possible and preferable for the thermoblock to be further processed, more particularly further processed as part of the manufacturing process, after it was manufactured by means of the additive manufacturing process. Possible and preferred steps of secondary processing are, in particular, independently of one another or in combination:

heating the thermoblock manufactured by means of the additive manufacturing process, particularly to a melting temperature of the material thereof; or cooling;

coating, particularly by immersion bath or spraying, of the thermoblock manufactured by means of the additive manufacturing process;

chip-removing treatment of surfaces, in particular milling, polishing, of the thermoblock manufactured by means of the additive manufacturing process;

Such secondary processing steps in particular smooth the following surfaces, which have a recognizable surface porosity or roughness as a result of the additive manufacturing process: the underside of the base portion or the base plate in order to improve the thermal contact with the temperature control devices, particularly Peltier elements; the interior surface of the sample container receptacles in order to improve the thermal contact with the sample containers, particularly with the exterior surfaces thereof.

The thermoblock according to the invention can be characterized particularly by features of the manufacture thereof. Insofar as the method according to the invention for manufacturing the thermoblock is described by one or more steps within the scope of this invention, these steps can also readily be understood as features that describe the thermoblock structurally insofar as these steps structurally characterize the thermoblock. The additive manufacturing of the thermoblock or of one of its components characterizes the thermoblock, since this special type of manufacturing gives it a porosity of its surface and/or its volume.

The method according to the invention for manufacturing the thermoblock is described in the context of this description particularly by steps of this method. Insofar as the thermoblock is described by structural features in the context of this description, for example by supporting structures provided between adjacent sample container receptacles and located above the base portion, steps of the method according to the invention for manufacturing the thermoblock can also be derived directly therefrom, for example that the method for manufacturing the thermoblock comprises the step of additively manufacturing the abovementioned support structures together with the sample container receptacles.

Further preferred embodiments of the thermoblock according to the invention and of the method according to the invention for the manufacture thereof follow from the following description of the exemplary embodiments in connection with the figures and their description. Identical components of the exemplary embodiments are substantially identified by the same reference symbols unless otherwise indicated or otherwise apparent from the context. In the drawings:

FIG. 1 schematically shows a method according to the invention for manufacturing a thermoblock according to a first exemplary embodiment.

Figure 1:
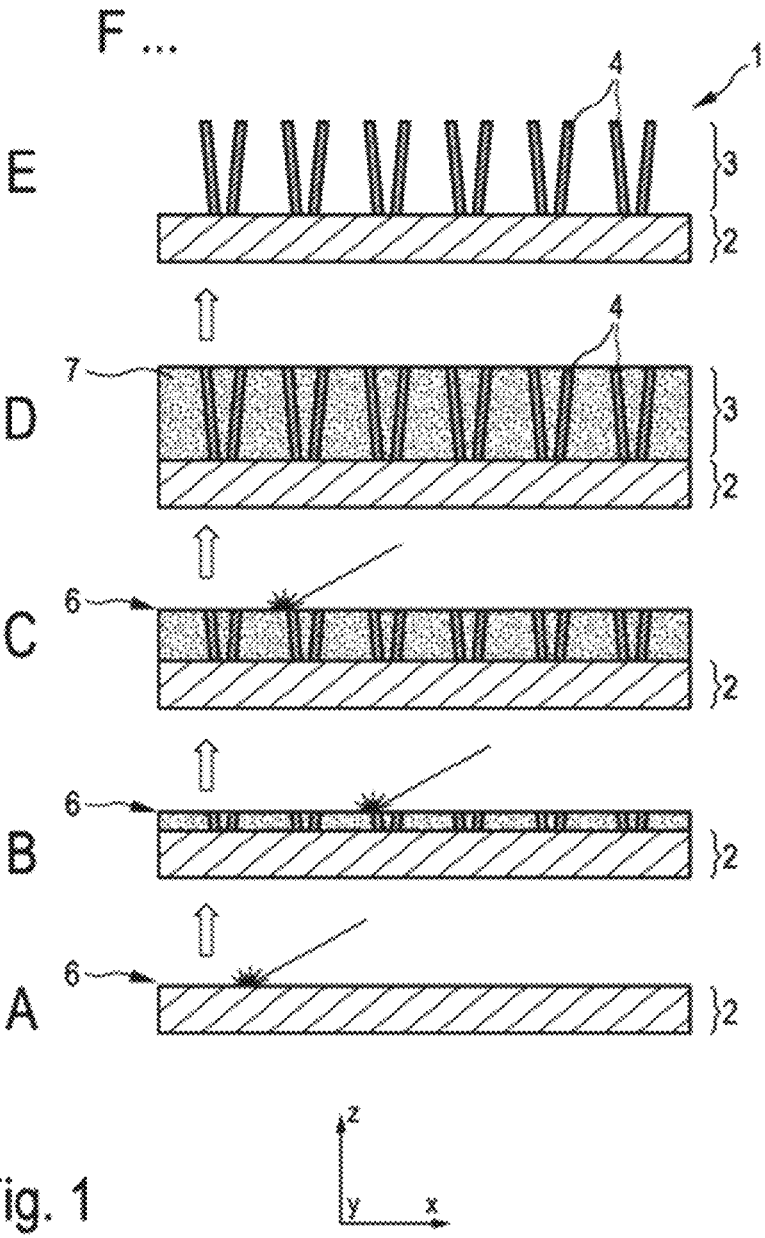

Further preferred embodiments of the thermoblock according to the invention and of the method according to the invention for the manufacture thereof follow from the following description of the exemplary embodiments in connection with the figures and their description. Identical components of the exemplary embodiments are substantially identified by the same reference symbols unless otherwise indicated or otherwise apparent from the context. In the drawings:

FIG. 1 schematically shows a method according to the invention for manufacturing a thermoblock according to a first exemplary embodiment.

Figure 2A:
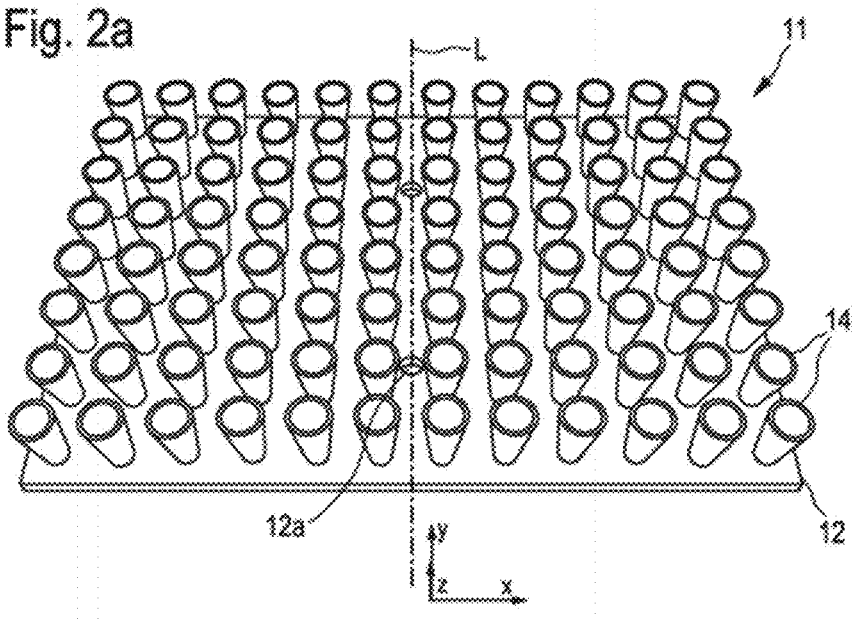
FIG. 2a shows the graphic, camera-perspective reproduction of a thermoblock according to the invention according to the first exemplary embodiment.

FIG. 2a shows the graphic, camera-perspective reproduction of a thermoblock according to the invention according to the first exemplary embodiment.

Figure 2B:
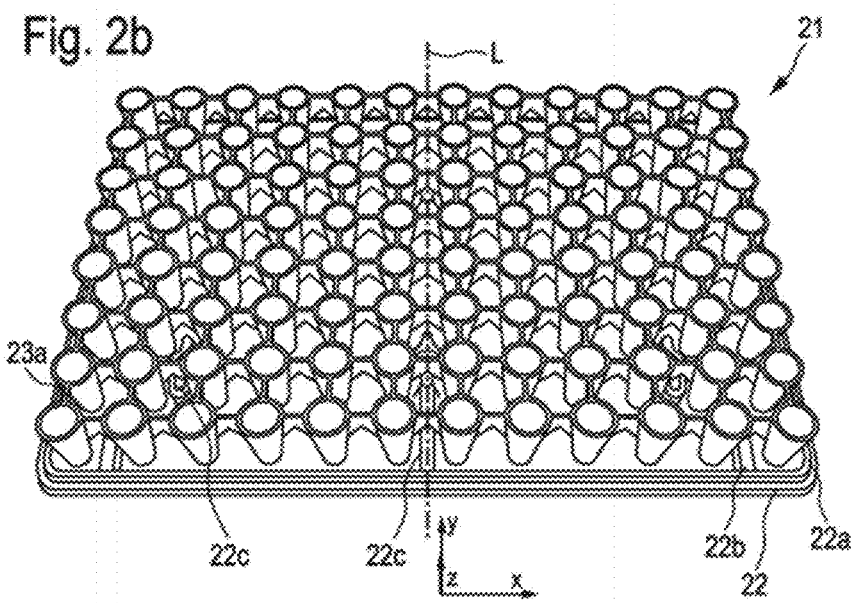
FIG. 2b shows the graphic, camera-perspective reproduction of a thermoblock according to the invention according to a second exemplary embodiment.

FIG. 2b shows the graphic, camera-perspective reproduction of a thermoblock according to the invention according to a second exemplary embodiment.

Figure 3A:
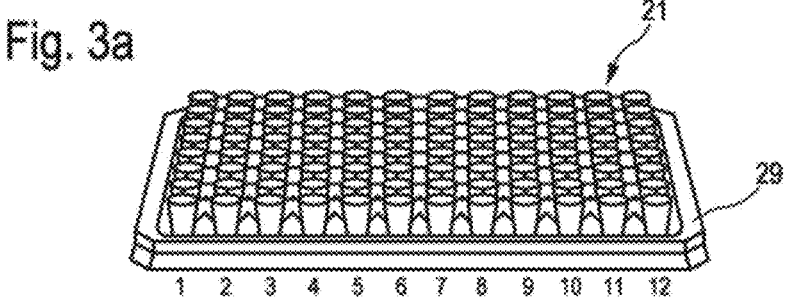
FIG. 3a shows the thermoblock according to FIG. 2b arranged in a frame of a thermocycler.

FIG. 3a shows the thermoblock according to FIG. 2b arranged in a frame of a thermocycler.

Figure 3B:
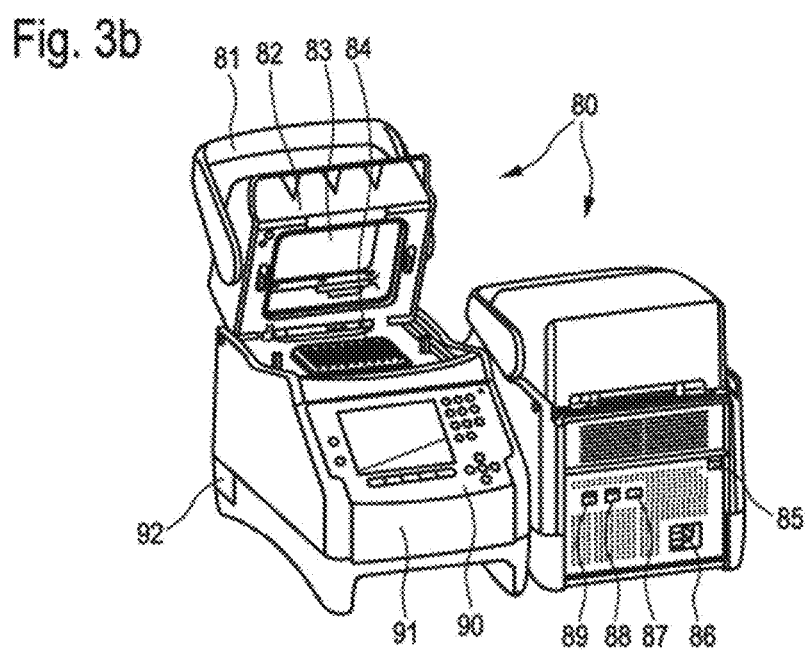
FIG. 3b shows a perspective view of a thermocycler with the thermoblock of FIG. 2b arranged in the frame, once obliquely from the front and once obliquely from the rear.

FIG. 3b shows a perspective view of a thermocycler with the thermoblock of FIG. 2b arranged in the frame, once obliquely from the front and once obliquely from the rear.

Figure 4A:
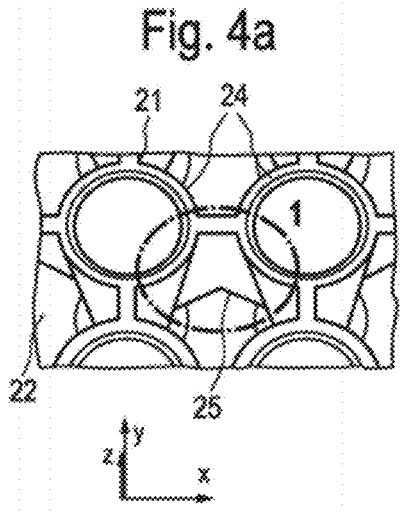
FIG. 4a shows a perspective view of a cut-out of a thermoblock according to the invention according to the second exemplary embodiment.

FIG. 4a shows a perspective view of a cut-out of a thermoblock according to the invention according to the second exemplary embodiment.

Figure 4B:
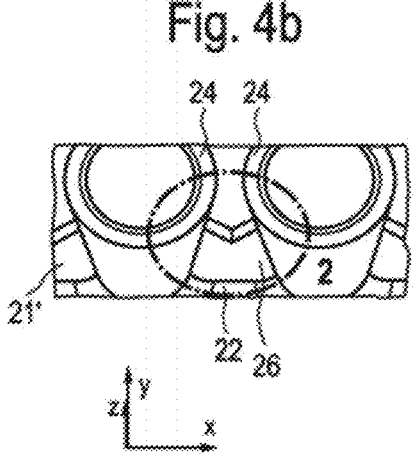
FIG. 4b shows a perspective view of a cut-out of a thermoblock according to a third exemplary embodiment.

FIG. 4b shows a perspective view of a cut-out of a thermoblock according to a third exemplary embodiment.

Figure 4C:
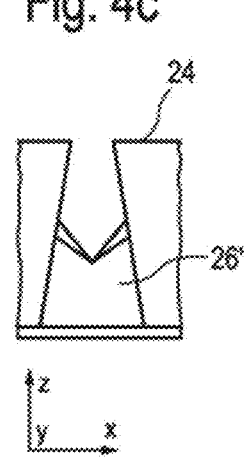
FIG. 4c shows, in a front view, detail of a thermoblock according to a fourth exemplary embodiment.

FIG. 4c shows, in a front view, detail of a thermoblock according to a fourth exemplary embodiment.

Figure 4D:
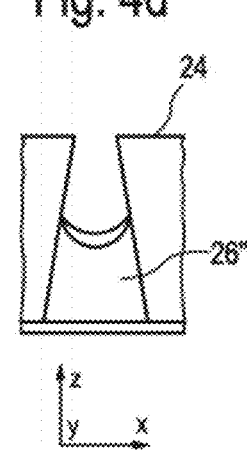

FIG. 4d shows, in a front view, a cut-out of a thermoblock according to the invention according to a fifth exemplary embodiment.

Figures 5A, 5B:
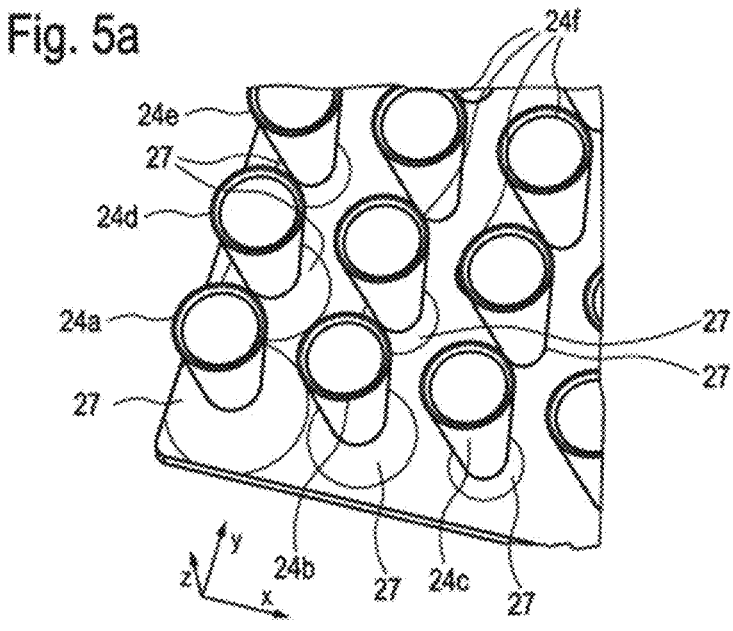

FIG. 5a shows a perspective view of a cut-out of a thermoblock according to a sixth exemplary embodiment.

FIG. 5b shows a perspective view of a cut-out of a thermoblock according to a seventh exemplary embodiment.

Figure 6A:
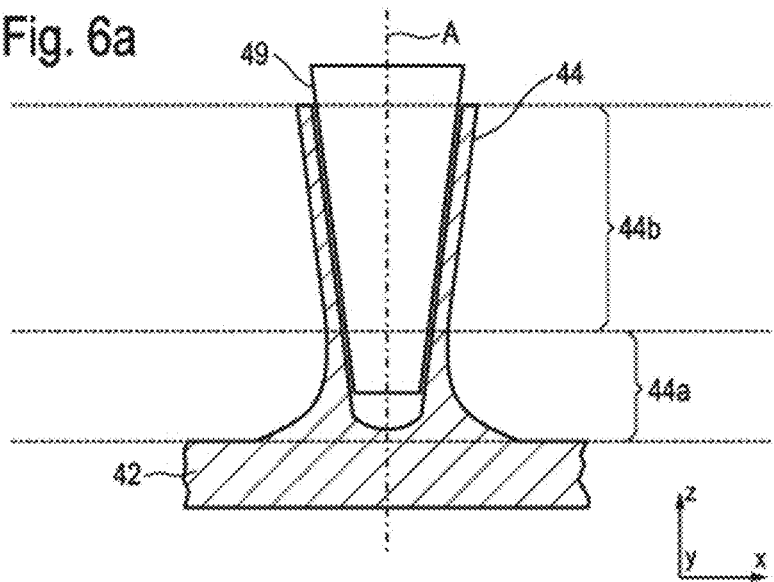

FIG. 6a shows, in a lateral cross-sectional view, detail of a thermoblock according to an eighth exemplary embodiment.

Figure 6B:
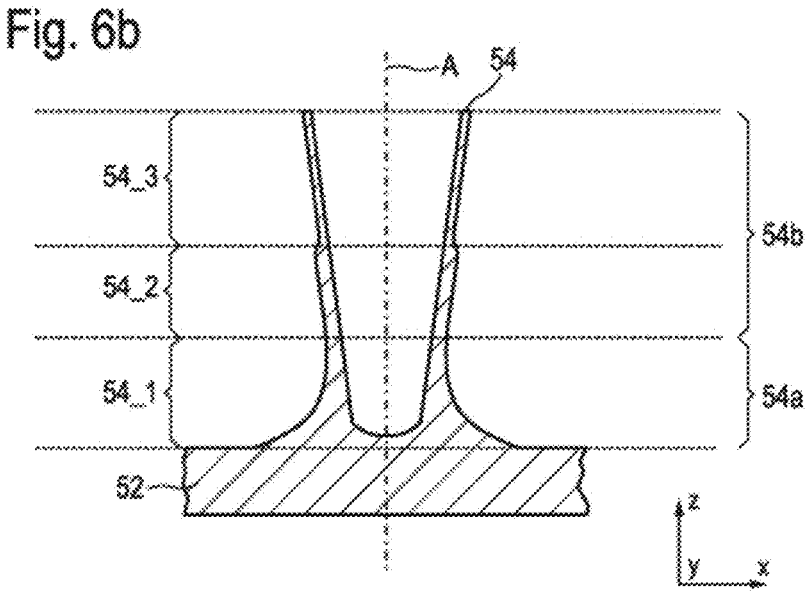

FIG. 6b shows, in a lateral cross-sectional view, detail of a thermoblock according to the invention in a ninth exemplary embodiment.

Figure 7A:
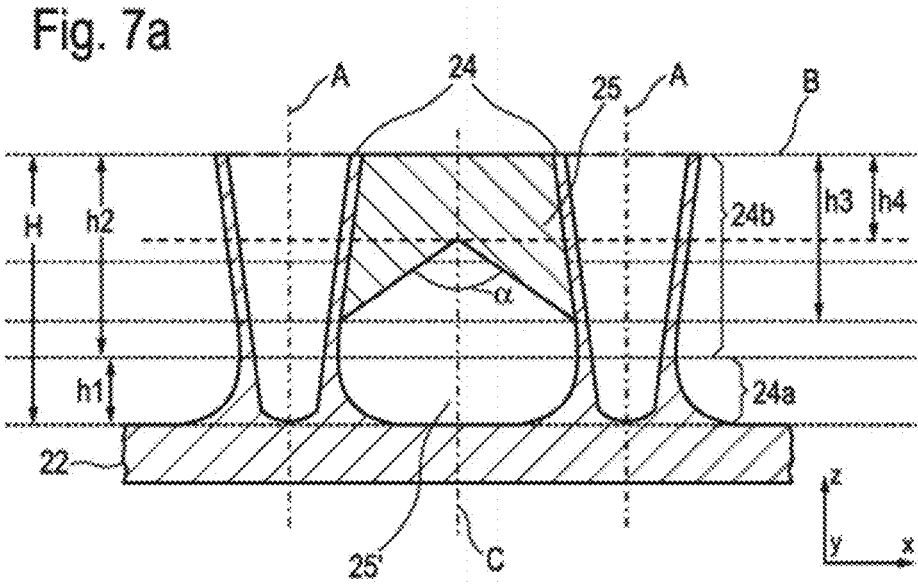

FIG. 7a shows, in a lateral cross-sectional view, detail of a thermoblock according to the invention according to the second exemplary embodiment.

Figure 7B:
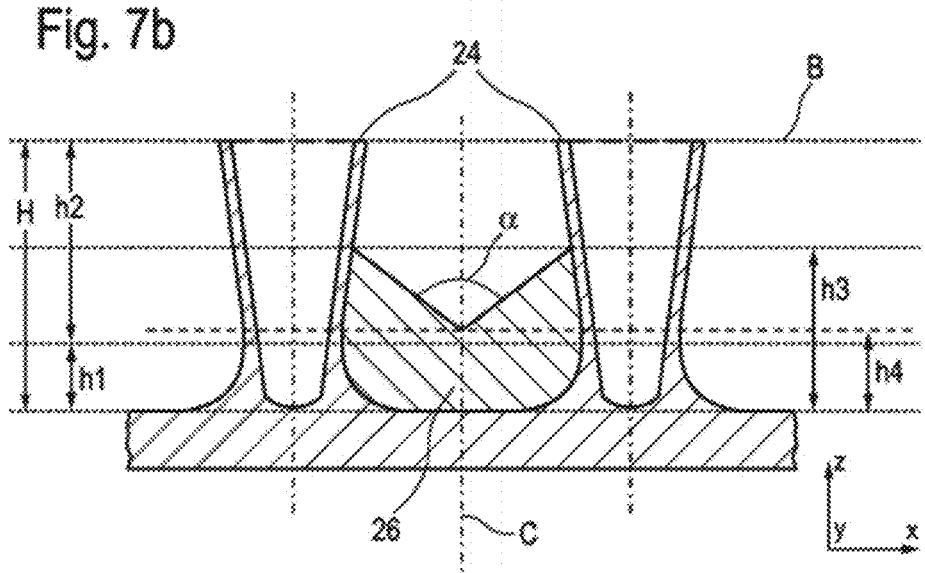

FIG. 7b shows, in a lateral cross-sectional view, a cut-out of a thermoblock according to the invention according to the third exemplary embodiment.

Figure 8A:
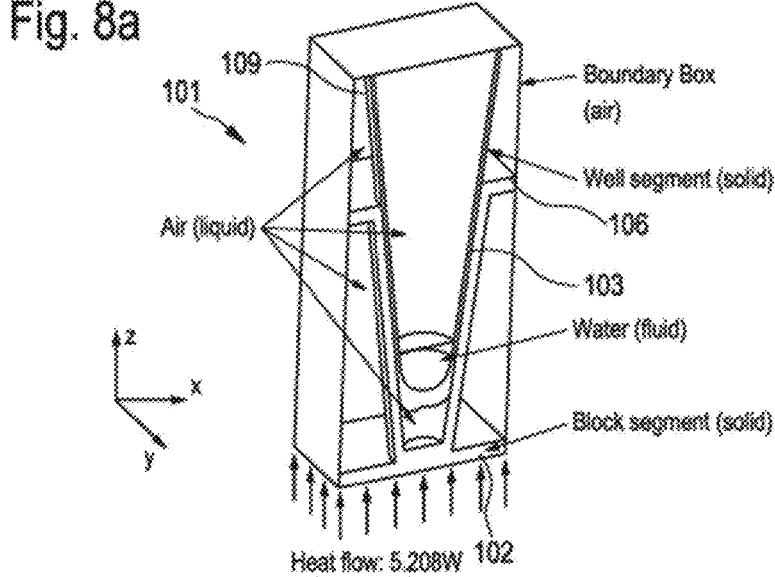

FIG. 8a shows a perspective view of a cut-out of a thermoblock according to a tenth exemplary embodiment, this cut-out serving as a model for carrying out an exemplary method for simulating or calculating the form structure of a thermoblock according to the invention.

Figure 8B:
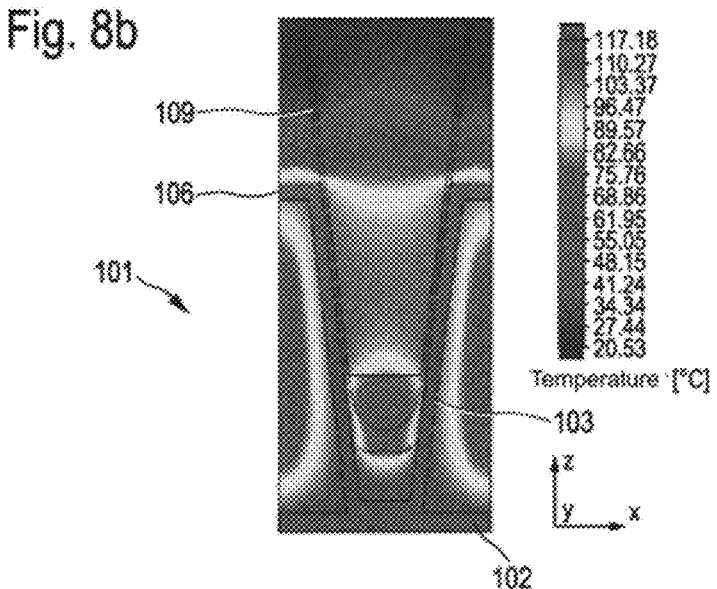

FIG. 8b shows a calculated thermal image showing a lateral cross-sectional view of the cut-out of the thermoblock according to FIG. 8a and the heat distribution present thereon, which results in an exemplary method according to the invention for simulating or calculating the form structure of the thermoblock.

Figure 9A:
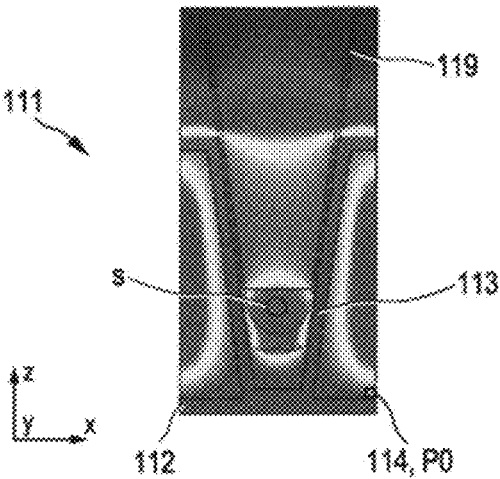

FIG. 9a shows a calculated thermal image showing a lateral cross-sectional view of a cut-out of a thermoblock according to an eleventh exemplary embodiment and the heat distribution present thereon, which results in an exemplary method according to the invention for simulating or calculating the form structure of the thermoblock.

Figure 9B:
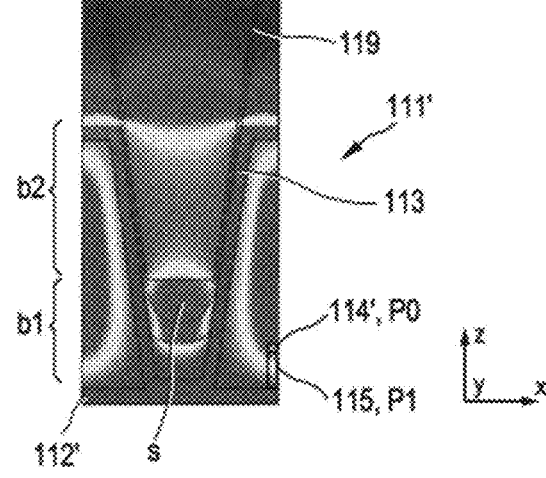

FIG. 9b shows a calculated thermal image showing a lateral cross-sectional view of a cut-out of a thermoblock according to a twelfth exemplary embodiment and the heat distribution present thereon, which results in an exemplary method according to the invention for simulating or calculating the form structure of the thermoblock.

Figures 10A, 10B:
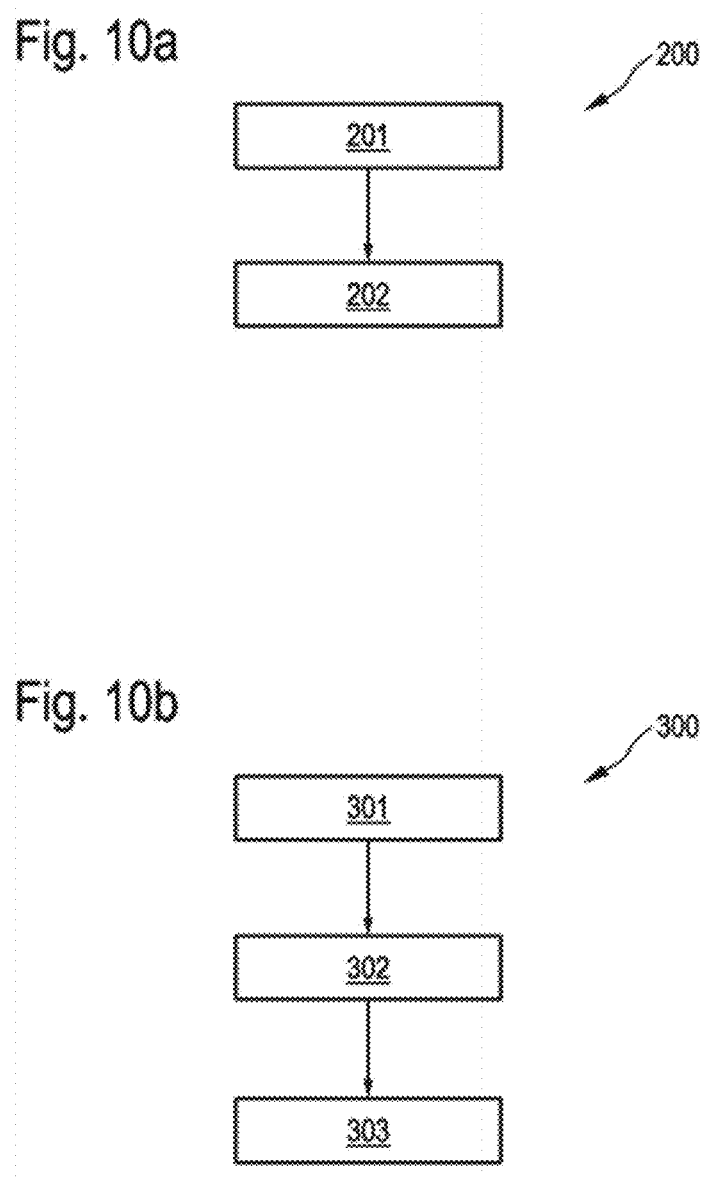

FIG. 10a schematically shows the method for manufacturing a thermoblock according to an exemplary embodiment.

FIG. 10b schematically shows the method for calculating the form structure of a thermoblock according to an exemplary embodiment.

FIG. 1 schematically shows an exemplary embodiment of a method 100 according to the invention for manufacturing a thermoblock 1 according to the invention. Selective Laser Melting (SLM) is used in this method as an additive manufacturing process for manufacturing the thermoblock. A laser beam 5 is used for local melting of powdered material 6, here aluminum granules, for example, particularly EOS Aluminum AlSi10Mg. The EOS M 290 device, which is available from EOS GmbH, Electro Optical Systems, 82152 Krailling, Germany, can be used here. The laser is directed under computer control to points of a powder-filled plane 6 previously defined by a 3D model.

The process begins (not shown) by dividing 3D CAD file data into a layered model, with layers between 10 and 100 microns thick, for example, creating a 2D image of each layer. This file format is the industry standard STL file used for most layer-based 3D printing or stereolithography technologies. This file is then loaded by a file preparation software package that assigns parameters, values, and support structures, if any, as machine data. This machine data is interpreted by an SLM machine to create the product, the thermoblock.

In the method 100 described herein by way of example, thin layers of atomized fine metal powder are evenly distributed using a coating mechanism onto a substrate plate (not shown) as a powder-filled layer 6, typically metal, that moves on the vertical (Z) axis. This is preferably done in a chamber (not shown) that specifically contains a tightly controlled inert gas atmosphere. The laser and/or the substrate plate are moved laterally on the xy plane in order to produce the portions of the thermoblock to be formed on this plane. The thermoblock is created in layers. Each 2D slice of the part geometry is fused by selectively melting the powder within each layer and to the layer below using a high power continuous or pulsed laser beam. The laser energy is intense enough to allow preferably complete melting (welding) of the particles to form solid metal. The process is repeated layer by layer until the part is complete. Located in the chamber region is a material dispensing platform (not shown), a build platform (not shown), and a sweeping blade (not shown) that is used to move new powder across the build platform.

As shown in FIG. 1, a base portion 2 is first processed, in particular additively manufactured, in step A. The base portion 2 is a cuboid, planar base plate 2 in this case. The base portion could also be provided as a prefabricated component, e.g., as a cast and/or milled component. In steps B and C, the sample container portion 3 with the sample container receptacles 4 arranged in freestanding fashion next to one another is additively manufactured successively and layer by layer. In the first exemplary embodiment of the thermoblock 1, all of the sample container receptacles 4 are basically identical in shape. In the case of the sample container receptacles or base plate of the thermoblocks shown in the exemplary embodiments, a visual inspection reveals that there is surface granulation or roughness that can be attributed to the additive manufacturing process. In step D, the thermoblock 1 has already been manufactured, but the powdery residual material 7 is still arranged in the cuboid region of the sample container portion 3 between and in the sample container receptacles 4. In step E, the residual material 7 has been removed, and the additively manufactured thermoblock 1 is available separately.

In further steps F, the thermoblock 1 can still undergo secondary processing. The underside of the base plate is preferably smoothed, for example by milling, and the interior surfaces of the hollow cone-shaped portions of the sample container receptacles 4 are also preferably smoothed.

The commercial SLM machine used to manufacture the aluminum alloy thermoblocks shown in the exemplary embodiments was the EOS M 290, and the starting material in powder form was EOS Aluminum AlSi10Mg.

FIG. 2a is a reproduction of a photograph of an additively manufactured thermoblock 11 that corresponds in principle to the shape of the thermoblock 1. The thermoblock 11 has the planar cuboid, additively manufactured base plate 12 that was built up in layers during the additive process in order to obtain the sample container receptacles 14 which are integrally connected to the base plate 12. The base plate 12 has twelve holes 12a that extend through the base plate 12 perpendicularly to the main plane thereof. These holes are for mounting screws. The holes 12a can have been manufactured by additive manufacturing, or through secondary processing of the additively manufactured thermoblock by means of drilling.

The sample container receptacles 14 each have an identical shape. They are cup-shaped. The bottom of the cup is respectively formed by the base plate 12. The cup wall is in the form of a hollow cone. The hollow cone opens and expands upward (direction of the positive z-axis). The hollow cone has a rotationally symmetrical shape with respect to an axis A that is perpendicular to the main plane of the base plate 12. The axis A extends along the hollow cone through the center of symmetry thereof. The openings of all sample container receptacles 14 are all arranged in the same plane. This is the standard arrangement for accommodating standard-compliant microtiter plates or PCR plates. Reference is made to the aforementioned SBS standards. In principle, however, the heights of the sample container receptacles could be different; in particular, the openings of two, a plurality of, or all of the sample container receptacles 14 could be at different heights.

The thermoblock 11 has a total of 96 sample container receptacles which are arranged next to one another in a regular, rectangular grid. The grid cell of this grid is always square. The grid arrangement corresponds to the grid arrangement of a 96-well microtiter plate according to SBS standard ANSI SLAS 1-2004 (R2012) (see Section 4.1 and FIG. 1 of that standard, with 8 rows and 12 columns.

A line L is shown in each of FIGS. 2a and 2b, with reference to which a Cartesian coordinate system is shown whose z-axis extends parallel to the line L at the position thereof. Due to the photographic origin of the images in FIGS. 2a, 2b (also FIG. 3a), the axes A of the sample container images do not appear to extend parallel to one another, but in reality this is the case. The representation of FIGS. 2a, 2b, 3a is not isometric.

FIG. 2b is a reproduction of a photograph of an additively manufactured thermoblock 21. The thermoblock 21 has the planar cuboid, additively manufactured base plate 22 that was built up in layers during the additive process in order to obtain the sample container receptacles 24 which are integrally connected to the base plate 22. In the illustration, the main planes of the base plate 22 extend parallel to the xy plane.

In comparison to the thermoblock 11, the thermoblock 21 has additional structures 22a, 22b, 22c, 23a that were additively manufactured in the same manufacturing process as the thermoblock 21. The base plate 22 has additional structures 22a, 22b, 22c: the base plate has a web 22a that extends upward and around all of the sample container receptacles. Together with the upper side of the base plate 22, this forms a trough in which all of the sample container receptacles 24 are placed. In addition, the upper side of the base plate 22 has reinforcement structures 22b, 22c that are used to fasten the thermoblock 21 in the mounting position on the thermocycler (see FIG. 3b) and absorb the forces of the fastening and distribute them on the base plate when they are s screwed and/or clamped to a substrate, e.g., the heat sink of the Peltier elements (not shown) that are to be arranged under the base plate. The reinforcing shapes protruding upward from the base plate are cross-shaped (when viewed on the xy plane) and have holes in their center which extend through the base plate 22 perpendicularly to the main plane thereof. These holes are for mounting screws. The holes can have been created by additive manufacturing, or through secondary processing of the additively manufactured thermoblock by means of drilling.

The grid arrangement corresponds to the grid arrangement of a 96-well microtiter plate according to SBS standard ANSI SLAS 1-2004 (R2012) (see Section 4.1 and FIG. 1 of that standard, with 8 rows and 12 columns.

A line L is shown in each of FIGS. 2a and 2b, with reference to which a Cartesian coordinate system is shown whose z-axis extends parallel to the line L at the position thereof. Due to the photographic origin of the images in FIGS. 2a, 2b (also FIG. 3a), the axes A of the sample container images do not appear to extend parallel to one another, but in reality this is the case. The representation of FIGS. 2a, 2b, 3a is not isometric.

FIG. 2b is a reproduction of a photograph of an additively manufactured thermoblock 21. The thermoblock 21 has the planar cuboid, additively manufactured base plate 22 that was built up in layers during the additive process in order to obtain the sample container receptacles 24 which are integrally connected to the base plate 22. In the illustration, the main planes of the base plate 22 extend parallel to the xy plane.

In comparison to the thermoblock 11, the thermoblock 21 has additional structures 22a, 22b, 22c, 23a that were additively manufactured in the same manufacturing process as the thermoblock 21. The base plate 22 has additional structures 22a, 22b, 22c: the base plate has a web 22a that extends upward and around all of the sample container receptacles. Together with the upper side of the base plate 22, this forms a trough in which all of the sample container receptacles 24 are placed. In addition, the upper side of the base plate 22 has reinforcement structures 22b, 22c that are used to fasten the thermoblock 21 in the mounting position on the thermocycler (see FIG. 3b) and absorb the forces of the fastening and distribute them on the base plate when they are s screwed and/or clamped to a substrate, e.g., the heat sink of the Peltier elements (not shown) that are to be arranged under the base plate. The reinforcing shapes protruding upward from the base plate are cross-shaped (when viewed on the xy plane) and have holes in their center which extend through the base plate 22 perpendicularly to the main plane thereof. These holes are for mounting screws. The holes can have been created by additive manufacturing, or through secondary processing of the additively manufactured thermoblock by means of drilling.

In principle, one, a plurality of, or all of the additional structures mentioned can be provided for each thermoblock according to the invention.

The sample container receptacles 24 each have an identical shape. The shape corresponds to the sample container receptacles 14 in FIG. 2a. In contrast to the thermoblock 11, the thermoblock 21 has a reinforcement structure 23a that is fabricated here additively or integrally with the sample container portion (23) and particularly also integrally with the base plate 22 so as to be completely above the base plate and, in the present case, without directly contacting the same.

The reinforcement structure 23a has a total of 172 connecting webs via which each sample container receptacle 14 is integrally connected to at least one adjacent sample container receptacle 14. Of these 172 connecting webs, $8*11=88$ respectively extend parallel to the x-axis or the first long side of the base plate, and of these 172 connecting webs, $7*12=84$ respectively extend parallel to the y-axis or the second long side of the base plate. The total of $2*8+2*10=36$ peripheral sample container receptacles of the grid arrangement are each integrally connected to adjacent sample container receptacles via two connecting webs, and the $6*10=60$ internal sample container receptacles of the grid arrangement are each integrally connected to adjacent sample container receptacles via four connecting webs.

Starting from a thermoblock with a total of n*m sample container receptacles arranged in a rectangular grid of n rows and m columns, the preferred arrangement of the connecting webs of the reinforcement structure 23a of the exemplary embodiment can be abstracted as follows: The reinforcement structure has a total of $n*(m-1)+(n-1)*m$ connecting webs via which each sample container receptacle is integrally connected to at least one adjacent sample container receptacle. Of these $n*(m-1)+(n-1)*m$ connecting webs, a number of $n*(m-1)$ connecting webs respectively extend parallel to the x-axis or to the first longitudinal side of the base plate, and a number of $(n-1)*m$ connecting webs respectively extend from these 172 connecting webs so as to be parallel to the y-axis or to the second long side of the base plate. The total of $2*n+2*(m-1)$ peripheral sample container receptacles of the grid arrangement are each integrally connected to adjacent sample container receptacles via two connecting webs, and the $(n-2)*(m-2)$ internal sample container receptacles of the grid arrangement are each integrally connected to adjacent sample container receptacles via four connecting webs. For the thermoblocks shown in their entirely in FIGS. 2b and 3a, n=8, m=12, respectively.

The connecting webs of the reinforcement structure 23a (FIGS. 2b and 3a) can, for example, be shaped and arranged as shown in greater detail in FIGS. 4a and 7a. Alternatively, they can be shaped and arranged as shown in greater detail in FIGS. 4b, 4c, 4d, 7b, respectively. In the present case, the connecting webs of the reinforcement structure are arranged parallel to the x- and y-axes, but alternatively and/or in addition they can also be provided with a shape that deviates from this, for example parallel to lines that form an angle other than 90°, particularly an angle of 45°, to the x- or y-axis (also referred to as a "diagonal arrangement").

FIG. 3a shows the thermoblock 21 according to FIG. 2b arranged in a frame 29 of a thermocycler.

FIG. 3b shows the same thermocycler 80 twice in perspective, once obliquely from the front and once obliquely from the rear. The thermoblock 91, which is arranged in a frame 99 which corresponds to the frame 29 shown in FIG. 3a, is visible in the front view shown on the left. The hinged lid of the thermocycler is shown in the open state in the front view; this swing lid is closed in the rear view.

The thermocycler 80 shown in FIG. 3c has a hinged lid 82 that is equipped with a lid handle 81 which is pivotably arranged on the lid 82 and by means of which the lid 82 can be opened/closed and locked/unlocked by the user. In the completely locked state, the heatable pressure plate 83 that is arranged in the lid exerts a contact pressure on the sample container(s) arranged in the sample container receptacles of the thermoblock 84. The thermoblocks shown in the exemplary embodiments are all sufficiently stable to withstand the pressure throughout their service life without being damaged.

Any thermoblock according to the invention described herein in the exemplary embodiments of the figures can serve as the thermoblock 84. The thermoblock 84 is contacted on its underside (not visible) by means of Peltier elements. The underside of the Peltier elements, in turn, is thermally contacted by a metallic heat sink or another cooling system in order to dissipate the waste heat of the Peltier elements to the environment which they generate during temperature-controlling (controlled heating/cooling). In order to ensure uniform thermal contact of the heat-transferring surfaces of the thermoblock 84, the Peltier elements, the heat sink, and any heat-transferring media or components that may be arranged between these components, the thermoblock 84, the Peltier elements, the heat sink, and any heat-transferring media or components arranged between these components are pressed against one another by means of a fastening system, which exerts a permanent pressure on the thermoblock 84. The thermoblocks shown in the exemplary embodiments are all sufficiently stable to withstand this permanent pressure over their entire service life without being damaged.

The thermocycler 80 is controlled by an electronic control device (not shown). The control device has, in particular, a microprocessor and control software (neither shown). The thermocycler has various interfaces for the energy supply and for data exchange; ethernet 85, network 86, mode switch 87, CAN out 88, CAN in 89. A maintenance flap 91 and a data plate 92 are also shown. The thermocycler 80 can be operated and, in particular, programmed by the user via a user interface device, which here has a control panel 90 with a touch screen and control elements. The thermocycler can be programmed by the user via parameter settings, and/or suitable programs that are stored in a memory of the control device can be selected by the user in order to have a desired temperature control protocol executed automatically. With such a temperature control protocol, the temperature of the thermoblock 84 of the thermocycler 80 is controlled successively or periodically according to a temperature cycle. Such a temperature control protocol serves the particular purpose of carrying out an amplification of a substance present in the liquid solution, particularly of carrying out a polymerase chain reaction (PCR). A single container or—analogously—a sample plate (microtiter plate or PCR plate) containing a specific volume of the liquid solution (or various such solutions) can be arranged in one, a plurality of, or all of the sample container receptacles of the thermoblock. The thermocycler can be operated in such a way that each of these individual containers or each of these sample container receptacles is temperature-controlled to the same temperature to the greatest possible extent during each temperature stage of the temperature control cycle. The thermoblock according to the invention is preferably shaped and designed in such a way that each of its sample container receptacles is temperature-controlled to the same temperature to the greatest possible extent during each temperature stage of the temperature control cycle. The integral manufacture of the thermoblock and, in particular, the special design thereof with reinforcement structures or temperature control structures serves this purpose.

Structures of the thermoblock that mechanically stabilize it are referred to as reinforcement structures. Structures of the thermoblock by means of which the desired heat transfer or the desired temperature distribution in the thermoblock or in the sample containers arranged therein is achieved or optimized are referred to as temperature control structures. A reinforcement structure can also serve as a temperature control structure, and vice versa. The reinforcement structures or temperature control structures can be unequivocally determinable by structural parameters. In this way, the structural parameters and hence the shape of the thermoblock can be determined or optimized using a simulation method according to the invention or a method according to the invention for calculating the form structure of a thermoblock 84.

FIG. 4a shows a perspective view of the cut-out of the thermoblock 21. There, in the region marked "1," a connecting portion or connecting web 25 of the reinforcement structure 23a can be seen which connects two adjacent sample container receptacles 24 to one another and is manufactured integrally therewith. The connecting web(s) 25 serve as a reinforcing structure and, at the same time, as a temperature control structure. The simulation method has shown in particular that the connecting webs 25 can be used to distribute the heat between adjacent sample containers. The connecting webs are not directly connected to the base plate. They extract heat from the sample container receptacle by exchanging heat with the environment. This effect increases with the surface area of the connecting webs. These connecting webs are therefore suitable for cooling hotter sample container receptacles and improving temperature homogeneity in the thermoblock. Structural parameters for optimal heat transfer, particularly optimal heat extraction, are particularly the thickness of the connecting webs and the shortest distance thereof from the structure to the base plate.

Another benefit of these connecting webs between the sample container receptacles is that they impart the necessary stability and rigidity to the thermoblock. The connecting webs 25 are as far away as possible from the center of gravity of the thermoblock and can therefore be made smaller and/or thinner. Another advantage is that the thermal influence of small connecting webs is relatively small. The heat must first flow through the sample container receptacle and consequently heats up the connecting webs 25 last.

During production planning, care is preferably taken to ensure that overhanging geometries are provided with permissible construction angles for 3D printing (usually angles of >30-45°).

FIG. 4b shows a perspective view of the cut-out of the thermoblock 21', which is constructed analogously to the thermoblock 21 apart from the shape and position of the connecting webs. There, in the region marked "2," a connecting portion or connecting web 26 of the reinforcement structure 23a can be seen which connects two adjacent sample container receptacles 24 to one another and is manufactured integrally therewith. The connecting web(s) 26 serve as a reinforcing structure and, at the same time, as a temperature control structure.

Here, the connecting webs 26 between the sample container receptacles 24 are also connected to the base plate 22. This has the effect that the heat is conducted from the hotter spaces to the sample container receptacles, whereby the temperature homogeneity can be increased. Here, structural parameters are the thickness and the general shape of the connection (rounded with variable diameters, angular/triangular with variable angles; see the connecting web 26' in FIG. 4c and the connecting web 26" in FIG. 4d).

FIG. 5a shows a cut-out of a thermoblock 31 in perspective. The corner (24a) and/or the peripheral (24b, 24c, 24d, 24e) and the internal (24f) sample container receptacles 24a, 24b, 24c, 24d, 24e and 24f of the thermoblock 31 have foot portions 27 here, each with a different design. In particular, the foot portion 27 of the corner sample container receptacle 24a has a greater mass than the foot portion 27 of the peripheral (24b, 24c, 24d, 24e) and the internal (24f) sample container receptacles. In particular, the foot portion 27 of the peripheral sample container receptacles 24b, 24c, 24d, 24e has a greater mass than the foot portion 27 of the internal sample container receptacles 24f. This is achieved particularly through the radius of curvature of the foot portion as viewed on a plane perpendicular to the xy plane that is greater for the corner sample container receptacle 24a than for the other non-corner sample container receptacles. One of the four corner regions of the thermoblock is shown, but they all have analogous designs. Possible structural parameters for simulation-based optimization are particularly the mass and/or the bending radius of the foot portion or of a plurality of or of all foot portions.

FIG. 5b shows a perspective view of a cut-out of a thermoblock according to a seventh exemplary embodiment. Instead of the foot portion, the wall thicknesses of the substantially hollow cone-shaped sample container receptacle are varied here. In particular, the corner sample container receptacle 24a' has a greater wall thickness than the peripheral 24b', 24c', 24d' and the internal 24f sample container receptacles. In particular, the peripheral sample container receptacles 24b, 24c, 24d, 24e have a greater wall thickness than the internal sample container receptacles 24f. The individual thickening of the wall thicknesses of the sample container receptacles and the individual variation of the heat flow achieved as a result can have positive effects on the homogeneity and speed of the thermoblock. Possible structural parameters for simulation-based optimization are particularly the wall thicknesses of individual, a plurality of, or all sample container receptacles of the thermoblock.

FIG. 6a shows, in a lateral cross-sectional view, detail of a thermoblock according to an eighth exemplary embodiment. Visible in particular is a portion of a base plate 42 and particularly the sample container receptacle 44, in which a conical sample container 49 (or a sample container with at least a conical portion on the outer wall) is inserted which is in thermal-physical contact with the interior surface of the sample container receptacle 40. The lower end portion or foot portion 44a and the hollow cone-shaped upper wall portion 44b are particularly shown. In the upper wall portion 44b, the sample container receptacle 40 has a smaller wall thickness than in the lower end portion or foot portion 44a into which the internal volume of the sample container receptacle 44 also extends in this case. The sample container receptacle 44 is designed here to be rotationally symmetrical to the longitudinal axis A. The heights and thicknesses mentioned are structural parameters.

FIG. 6b shows, in a lateral cross-sectional view, detail of a thermoblock according to the invention in a ninth exemplary embodiment. Particularly visible are a portion of a base plate 52 and particularly the sample container receptacle 54, into which a cone-shaped sample container 49 can be inserted in order to bring it into thermal-physical contact with the cylindrical interior surface of the sample container receptacle 40. The sample container receptacle 50 is designed here to be rotationally symmetrical to the longitudinal axis A. The lower end portion or foot portion 54a and the hollow cone-shaped upper wall portion 54b are particularly shown. In the upper wall portion 54b, the sample container receptacle 40 has a smaller wall thickness than in the lower end portion or foot portion 54a into which the internal volume of the sample container receptacle 54 also extends in this case.

The sample container receptacle 54 has at least two regions 54b', 54b" with different wall thicknesses in the upper wall portion 54b, resulting in a total of three characteristic wall subportions of the wall: A lower wall subportion 54_1 can be seen in the foot portion 54a which—averaged along the longitudinal axis A—has a greater wall thickness on average than the other wall subportions 542, 54_3. The wall thickness of the middle wall subportion 54_2 is substantially constant here and smaller than the wall thickness in the lower wall subportion 54_1 but greater than the thickness in the upper wall subportion 54_3. The transitions between the outer sides of the wall subportions are preferably edge-free, but they can also be step-like and/or angular. On the interior surface, the wall subportions follow the shape of the opening cone continuously upward in the longitudinal direction. The wall subportions together fulfill the purpose as the fill level portion, and the wall subportion 54_3 fulfills the purpose as the empty portion, as previously described above. The heights and thicknesses mentioned are structural parameters.

FIG. 7a shows a cut-out of the thermoblock 21 in a lateral cross-sectional view with the base plate 22 and the sample container receptacles 24. The connecting web 25 connects the adjacent sample container receptacles 24 and is integrally connected thereto as a result of the additive manufacturing. The connecting web 25 is not directly connected to the base plate 22, but rather it is separated from the base plate by a void 25'. The total height of the sample container receptacle 24 is H, the height of the bottom wall portion 24a is h1, the height of the top wall portion 24b is h2, the maximum height of the connecting web 25 is h3, and the minimum height of the connecting web 25 is h4. The heights are each measured along the longitudinal axis A. The thickness of the connecting web is measured perpendicularly to the surface of the connecting web 25, here along the y-axis. The connecting web 25 can respectively transition into the outer wall of the adjacent sample container receptacles 24 without any edges; the thickness of the connecting web 25 can change particularly—but not only—in this transition region. The heights and the thickness mentioned are structural parameters. Preferably $h3 \geq 0.5 * H$; particularly h3 S H. Preferably $h4 = 0.5 * h3$ (this value with a range of preferably $+-5\%$ of h3), h3 s $0.5*H$, $h3 \leq 0.3*H$, h3 $0.1*H$. The upper edge of the connecting web preferably extends in, or parallel beneath, a plane B, in which the openings of the sample container receptacles 24 of the thermoblock are also arranged. The main surfaces (i.e., the two largest surfaces) of the connecting web 25 extend perpendicularly to the main plane of the base plate 22, in this case parallel to the zx plane or (not shown in FIG. 7a) to the zy plane. The bottom edge of the connecting web rises along the x-axis from both sides toward the centerline C of the connecting web, which is parallel to the longitudinal axis A. The two portions of this lower edge which converge toward one another meet at an angle α, preferably 90°≤α≤180°, preferably 110°≤α≤160°. The mentioned heights, the thicknesses and the angle α are structural parameters.

FIG. 7b shows a cut-out of the thermoblock 21 in a lateral cross-sectional view with the base plate 22 and the sample container receptacles 24. The connecting web 26 connects the adjacent sample container receptacles 24 and is integrally connected thereto as a result of the additive manufacturing; it is also connected directly and integrally to the base plate 22. The total height of the sample container receptacle 24 is H, the height of the bottom wall portion 24a is h1, the height of the top wall portion 24b is h2, the maximum height of the connecting web 26 is h3, and the minimum height of the connecting web 26 is h4. The heights are respectively measured along the longitudinal axis A. The thickness of the connecting web is measured perpendicularly to the surface of the connecting web 26, here along the y-axis. The connecting web 26 can merge seamlessly into the outer wall of the adjacent sample container receptacles 24 and/or into the base plate 22. The thickness of the connecting web 26 can change, particularly increase, particularly but not only in this transition region. The heights and the thickness mentioned are structural parameters. Preferably h3≥0.5*H; particularly h3≤H. Preferably h4=0.5*h3 (this value with a range of preferably +−5% of h3), h3 s 0.5*H, h3 s 0.3*H, h3 0.1*H. The lower edge of the connecting web preferably extends along the upper side of the base plate 22. The main surfaces (i.e., the two largest surfaces) of the connecting web 26 extend perpendicularly to the main plane of the base plate 22, in this case parallel to the zx plane or (not shown in FIG. 7a) to the zy plane. Here, the connecting web has a void between the upper edge of the connecting web 26 and the plane B. The top edge of the connecting web descends along the x-axis from both sides toward the center line C of the connecting web, which is parallel to the longitudinal axis A. The two portions of this upper edge which converge toward one another meet at an angle α, preferably 90° s a 180°, preferably 110°≤α≤160°. The mentioned heights, the thicknesses and the angle α are structural parameters.

FIG. 8a shows a perspective view of a cut-out of a thermoblock 101 according to a tenth exemplary embodiment, this cut-out serving as a model for carrying out an exemplary method for simulating or calculating the form structure of a thermoblock according to the invention. These calculations were carried out using ANSYS versions 2019 R1 and 2019 R2. The figure shows the initially air-filled unit cell (boundary box) used for the calculation in the interior region of the grid-shaped sample container arrangement of a thermoblock, with the structure of the unit cell being preferably different in the edge regions. The shape of the metal sample container receptacle 103 is shown here to be similar to that of the thermoblock 1, but the sample container receptacles are connected at the top by a plate 106 that extends parallel to the base plate 102, which in itself is a perforated plate into the holes of which the openings of the sample container receptacles open. In order to carry out the method for simulating or calculating the form structure of a thermoblock according to the invention, the assumptions illustrated there are made: A cone-shaped plastic container that physically and thermally contacts the interior surface of the sample container receptacle is arranged in the sample container receptacle. There is water up to a certain fill level in the plastic container. A constant heat flow of 5.208 W acts on the underside of the base plate.

FIG. 8b shows a calculated thermal image showing a lateral cross-sectional view of detail of the thermoblock 101 according to FIG. 8a and the heat distribution present thereon, which results in an exemplary method according to the invention for simulating or calculating the form structure of the thermoblock. It can be seen that there is a wide extension of the maximum temperature in the lower end region b1, parallel to the xy plane. This region can therefore be provided with a metal foot portion in order to increase or maximize the temperature control rate. The portion b2 above the water level is also strongly heated (empty portion): since there is no sample there, this heat is not used. However, the empty portion must be brought to temperature each time. The mass of the sample container receptacle in the empty portion is therefore preferably reduced or minimized. This can be done by reducing the wall thickness, as already shown, or by providing local thinning or porosity in this portion. This reduces the "parasitic" heat capacity of the thermoblock, which can be brought to temperature more quickly as a result.

FIG. 9a shows a calculated thermal image showing a lateral cross-sectional view of a cutout of a thermoblock 111 according to an eleventh exemplary embodiment and the heat distribution present thereon, which results in an exemplary method according to the invention for simulating or calculating the form structure of the thermoblock. The sample container receptacle 113 and the thermal image are similar to those in FIGS. 8a, 8b. The thermal sensor 114, which is used by the electronic control or regulating device for the measurement as part of the temperature regulation, is arranged directly on the base plate 112 in a position P0. FIG. 9b shows an arrangement of a thermoblock 111' that is modified compared to FIG. 9a and in which a base 115 is embodied, as an additional structure, as a vertical elevation protruding upward from the base plate 112'. A comparison with the resulting thermal image shows that the top of the base 115 protrudes from the region of maximum temperature and opens into a less heated region, the temperature of which is more similar to the temperature in the aqueous sample s. An even more reliable and precise electronic temperature control can be implemented with such an arrangement. In FIG. 9b, the thermal sensor 114', which is used by the electronic control or regulating device for the measurement as part of the temperature regulation, is arranged on the base 115 in a position P1 above the base plate.

Features of sample container receptacles and reinforcement structures or temperature control structures of the aforementioned examples can also be combined in a single thermoblock. Other preferred features that are not illustrated here but can be combined or used separately on a thermoblock according to the invention are:

a. Graduated depth of the sample container receptacles: Sample container receptacles on the edge can have a different sample container receptacle depth compared to internal sample container receptacles. This depth or these depths can be structural parameters.

b. Individual thickening of the base plate: By deliberately placing additional material on the base plate, local heat capacities can be adjusted in order to increase homogeneity. For this purpose, the base plate has at least two different plate regions, each of which has a different (constant or average) plate region thickness. The size (volume, surface area) of the plate regions and the plate region thicknesses can be structural parameters.

c. Individual recesses in the base plate: the heat capacity can be further reduced by local recesses in the base plate. This can improve speed and homogeneity. For this purpose, the base portion or the base plate has at least one or two or more or a multiplicity of recesses. These can each have a different (constant or average) recess depth. The size (volume, surface area) of the recesses and the recess depths can be structural parameters.

d. By virtue of the design freedom of the additive process, a sealing frame/mounting frame of the thermoblock can also be combined with the base plate in order to further reduce the heat capacity.

e. Reduction of the thermal influence of attachment structures, sleeves/webs/feet by absorbing the connective forces by providing grid structures that are optimally arranged and distributed on the base plate. The attachment structures are used particularly for the attachment of the thermoblock in the thermocycler.

FIG. 10a schematically shows the method for manufacturing a thermoblock that is used to receive and control the temperature of laboratory sample containers in a laboratory temperature control device, particularly in a PCR thermocycler, comprising the steps:

manufacturing the thermoblock by means of an additive manufacturing process (201);

secondary processing of the thermoblock manufactured by means of the additive manufacturing process by means of a secondary processing process, particularly by heating, coating, polishing, and/or chip-removing treatment (202).

FIG. 10b shows a schematic of the method for calculating the shape structure of a thermoblock which is used to receive and control the temperature of laboratory sample containers in a laboratory temperature control device, particularly in a PCR thermocycler, and which can be manufactured by means of an additive manufacturing process, with the shape structure of the thermoblock being definable by structural parameters, according to one exemplary embodiment, comprising the steps:

varying at least one structure parameter (301);

carrying out a simulation method for simulating the flow of heat through at least one portion of the thermoblock as a function of the at least one structural parameter; (302)

selecting at least one structural parameter on the basis of the simulation method for the additive manufacturing of the thermoblock structurally determined in this way. (303).

Speed advantages (maximum heating rate or cooling rate) of the 3D-printed thermal block 21 ("MC X50 3D block") compared to other thermal blocks installed in the same thermal cycler or in other commercially available thermal cyclers (manufacturer: Eppendorf AG, Germany) are observed as follows in the comparative experiment: Comparative ramp speed

The invention claimed is:

1. A thermoblock for receiving and controlling the temperature of at least one laboratory sample container in a laboratory temperature control device, particularly in a PCR thermocycler, characterized in that the thermoblock comprises:

a base plate having a first plate side configured for thermal coupling with a temperature control device and a second plate side opposite the first plate side, the second plate side being provided with a plurality of sample container receptacles for receiving and controlling the temperature of a plurality of laboratory sample containers, the plurality of sample container receptacles being arranged in a rectangular grid, and connecting portions which are arranged above the base plate and connect neighboring sample container receptacles of the plurality of sample container receptacles, the thermoblock including the base plate, the plurality of sample container receptacles, and the connecting portions, being manufactured by means of an additive manufacturing process using a metal-containing material.

2. The thermoblock as set forth in claim 1, comprising a multiplicity of sample container receptacles manufactured by means of the additive manufacturing process for receiving and controlling the temperature of a multiplicity of laboratory sample containers.

3. The thermoblock as set forth in claim 1, comprising at least one sample container receptacle which was manufactured by means of the additive manufacturing process and which is cup-shaped, particularly at least in the form of a hollow cone.

4. The thermoblock as set forth in claim 3, wherein at least one sample container receptacle has an opening for receiving the laboratory sample container as well as a foot portion situated opposite the opening that is integrally connected to the plate portion and was manufactured by means of the additive manufacturing process, the volume of the material of the foot portion decreasing upward starting from the base portion.

5. The thermoblock as set forth in claim 1, comprising a base portion and at least one sample container receptacle connected thereto having an opening for receiving the sample container and a wall portion that is arranged between the opening and the base portion, an interior surface of the wall portion is set up for thermal coupling to the laboratory sample container arranged in the sample container receptacle, the wall portion particularly comprising a lower wall subportion, a wall thickness of which is greater than a wall thickness of a wall subportion that is arranged above the same.

6. The thermoblock as set forth in claim 1, comprising the base plate that extends parallel to a plane arranged horizontally and at least two adjacent sample container receptacles connected thereto, with at least one, or precisely one, connecting portion extending parallel to the plane being present between the at least two adjacent sample container

| 40° C. <-> 90° C. | MC nexus AluBlock [° C./sec] | MC pro Al AluBlock [° C./sec] | MCX50a AluBlock [° C./sec] | MC nexus X1 silver block [° C./sec] | MC pro Ag silver block [° C./sec] | MC X50 3D block [° C./sec] | MC X50s silver block [° C./sec] |
|---|---|---|---|---|---|---|---|
| Heating rate | 3.1 | 3.1 | 5.0 | 5.0 | 6.6 | 9.1 | 10.0 |
| Cooling rate | 1.4 | 1.7 | 2.3 | 3.5 | 3.6 | 4.2 | 5.0 | receptacles, particularly between a plurality of or all immediately adjacent sample container receptacles.

7. The thermoblock as set forth in claim 6, wherein there is a void between the connecting portion and the base plate, and wherein said connecting portion is not directly connected to the base plate.

8. The thermoblock as set forth in claim 6, wherein there is no void between the connecting portion and the base plate, and/or wherein said connecting portion is directly connected to the base plate.

9. The thermoblock as set forth in claim 1, which has been manufactured integrally from a granulate containing aluminum or an aluminum alloy by means of the additive manufacturing process.

10. The thermoblock as set forth in claim 1, which, after the manufacture thereof by means of the additive manufacturing process, has been processed by a secondary processing method, particularly by heating, coating, polishing, and/or chip-removing treatment.

11. A laboratory device, particularly a PCR thermocycler, containing a thermoblock as set forth in claim 1.

\* \* \* \* \*